United States Patent [19]

Nakagawa et al.

[11] Patent Number: 4,870,486
[45] Date of Patent: Sep. 26, 1989

[54] VIRTUAL STEREOGRAPHIC DISPLAY SYSTEM

[75] Inventors: Kenichi Nakagawa, Nara; Kojiro Tsubota, Tenri; Kunihiko Yamamoto, Nara, all of Japan

[73] Assignee: Sharp Kabushiki Kaisha, Osaka, Japan

[21] Appl. No.: 221,601

[22] Filed: Jul. 20, 1988

Related U.S. Application Data

[63] Continuation of Ser. No. 15,053, Feb. 17, 1987, Pat. No. 4,772,943.

[30] Foreign Application Priority Data

| Feb. 17, 1986 | [JP] | Japan | 61-33145 |
| Feb. 18, 1986 | [JP] | Japan | 61-34192 |
| Feb. 24, 1986 | [JP] | Japan | 61-40942 |
| Mar. 10, 1986 | [JP] | Japan | 61-54472 |
| Aug. 13, 1986 | [JP] | Japan | 61-190363 |

[51] Int. Cl.$^4$ ............................................. H04N 13/04
[52] U.S. Cl. ................................. 358/92; 350/350 S; 350/132; 358/88
[58] Field of Search .................... 358/88, 92; 350/132, 350/350 S

[56] References Cited

U.S. PATENT DOCUMENTS

| 4,367,924 | 1/1983 | Clark | 350/350 S |
| 4,393,400 | 7/1983 | Ikushima | 358/92 |
| 4,672,434 | 6/1987 | Suzuki | 358/92 |
| 4,698,668 | 10/1987 | Milgram | 358/92 |

*Primary Examiner*—Howard W. Britton
*Attorney, Agent, or Firm*—Birch, Stewart, Kolasch, & Birch

[57] ABSTRACT

A virtual stereographic display system which includes a display image surface, a polarizer disposed before the display image surface, a liquid crystal cell in which ferroelectric smectic liquid crystal is aligned, and disposed before the polarizer, a driving circuit connected to the liquid crystal cell so as to apply AC voltage synchronized with the frame signal of the image on the display image surface to the liquid crystal cell and to switch over the polarization axes of the display light proceeding from the display image surface through the polarizer and liquid crystal cell by time division, and polarizing glasses having different polarization axes for the left eye and right eye for viewing the display light.

12 Claims, 18 Drawing Sheets

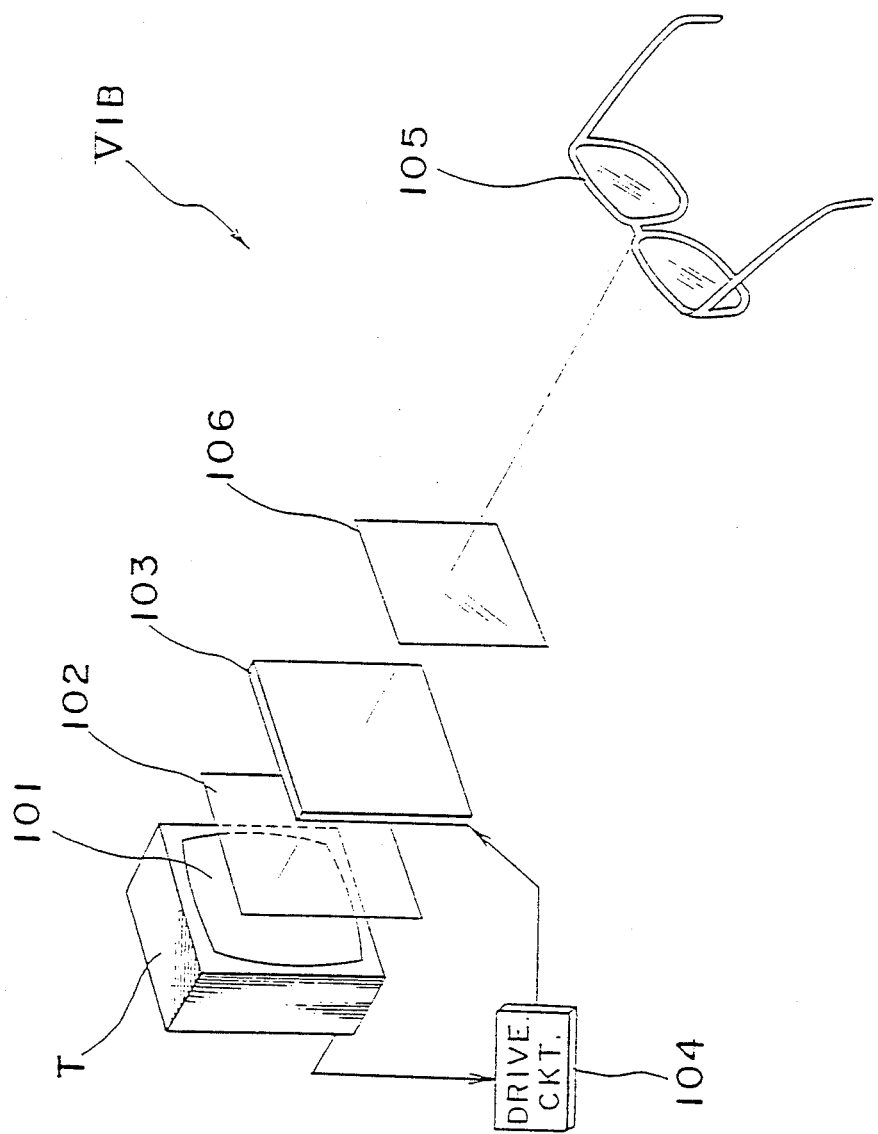

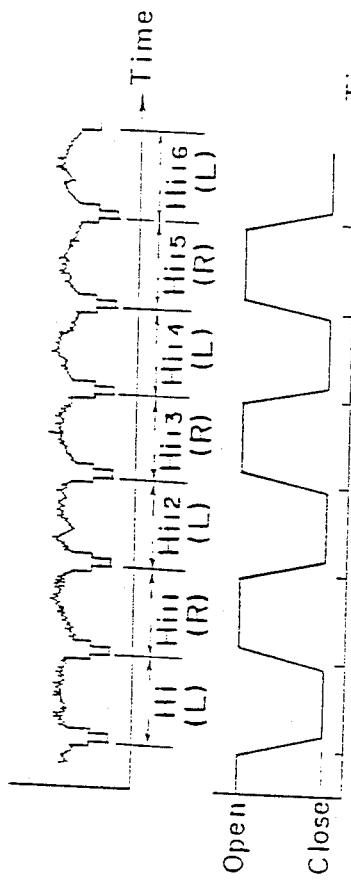
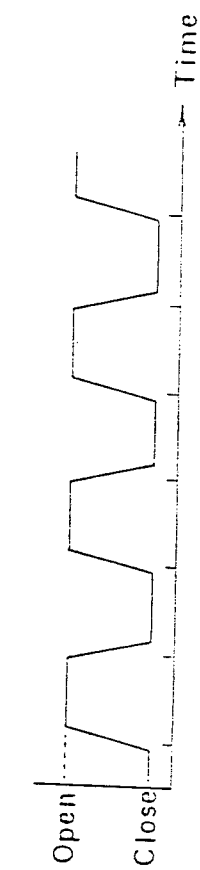
Fig. 23(A) TV signal
Fig. 23(B) Open/close function of light valve 117a
Fig. 23(C) Image signal entering right eye
Fig. 23(D) Open/close function of light valve 117b
Fig. 23(E) Image signal entering left eye

VIRTUAL STEREOGRAPHIC DISPLAY SYSTEM

This is a continuation of Ser. No. 07/15,053 filed Feb. 17, 1987, now U.S. Pat. No. 4,772,943.

BACKGROUND OF THE INVENTION

The present invention generally relates to an image display arrangement and more particularly, to a stereographic image display system such as a stereoscopic television or the like which utilizes parallax between the left and right eyes.

Various attempts have been made since very old times to realize three-dimensional images or stereographic images, and there are a large number of systems available therefor at present including laser hologram, etc. However, the systems that are successfully put into actual application as stereographic image display arrangements are currently limited to the following two systems. Each of these systems is based on a principle in which images for left and right eyes are separately displayed so as to bring about a false impression of stereoscope, or hallucinate viewers as if there were parallax due to a stereographic or solid object, based on the deviation between individual images composed on the retinas of a viewers' eyes, thereby effecting a virtual stereographic display of images.

The two systems referred to above are:

(1) The system in which images for left and right eyes are formed by plane-polarized light so that the polarization axes thereof are directed to form an angle of 90° with respect to each other, and thus, the images are observed in a separated state by glasses with polarizing plates. This system is mainly adopted in stereoscopic movies for theaters.

(2) The system in which images for left and right eyes are alternately displayed through time division by alternately switching the opening or of the glasses that function by an electronic light valve, in synchronization with the period of display, and the intended stereographic image display is effected.

The system in item (1) is close to ideal, since the stereographic images obtained thereby are free from flickering, while the glasses with polarizing plates to be worn by the viewers are light and inexpensive. However, in this known system, two display devices and projecting devices are required in order to simultaneously project two images with different polarization axes at all times, thus resulting in an increase of the number of devices involved, with a consequent complication of operations, and therefore, this system is not suitable for domestic use in general.

On the other hand, in the system referred to in item (2), although some flickering is noticed due to the half reduction of the number of frames per second which enters the left and right eyes, the system is realistic in that the stereograhic image can be formed by one television set.

With respect to the system in item (2), a virtual stereographic display arrangement has conventionally been proposed utilizing a television set. A system in which glasses having an electronic light valve function are constituted by liquid crystal cells, thereby switching the glasses with the light valve function for opening or closing in synchronization with the frame frequency or the field frequency of the television set.

However, the above known system also has a problem in that each of the viewers must inevitably wear the glasses with the electronic light valve function. More specifically, such glasses are not only heavy and cause fatigue after wearing them for a long time, but such glasses also tend to be expensive due to provision of the light valve function, and the cost therefor becomes a considerable amount when they are purchased for a number of viewers.

Moreover, most of the glasses with the electronic light valve function tend to eye give rise to fatigue due to the fact that the intensity of the transmitted light largely varies following the opening or closing of the light valves. Meanwhile, in a practice which utilizes the polarized light, it is unavoidable to reduce the intensity of the transmitted light to less than half based on the principles of polarized light with a consequent defect that the displayed images appear to be dark. A light valve device which removes such a defect has also been proposed which utilizes dynamic-scattering mode (DSM) of nematic liquid crystal, but such a device cannot fully cope with the frame frequency for the image display, since the dynamic-scattering mode has a slow response speed.

Furthermore, in the system of item (2), it is necessary to have the open/close function of the electronically controlled light valves synchronized with the display of images for the left and right eyes respectively, and conventionally, the signal has been derived from the vertical synchronizing signal of the television circuit. However, if the above practice is to be applied to an existing television set, it is required either to remodel internal circuits of the television set or to separately provide an adapter with a tuner only for deriving the synchronizing signal. Such remodeling is very difficult to be made at home in general, while the adapter with a tuner is a considerable expense for the user to purchase.

Generally, in the conventional virtual stereographic or stereoscopic display system utilizing the television set as described above, since the number of frames per second which enters each of the left and right eyes following open/close functions of the light valves of the glasses is to be reduced to half as compared with that in the normal display, flickering is noticed which results in eye fatigue. In order to eliminate such a disadvantage, there has been proposed a practice to increase the number of frames per second for the display, but alteration of a standard for the frame frequency makes it difficult to maintain interchangeability with respect to existing devices, and is not considered to be practical.

SUMMARY OF THE INVENTION

Accordingly, an essential object of the present invention is to provide a virtual stereographic display system of multiplexed double image type which is suitable for viewing by many persons, e.g., at home in general or in classrooms, etc.

Another important object of the present invention is to provide a virtual stereographic display system of the type described above which is equipped with observation glasses having an electronic light valve function with less eye fatigue, and a driving device for such glasses.

A further object of the present invention is to provide a virtual stereographic display system which is provided with a function capable of readily generating a synchronizing signal for driving the light valves at low cost, without the necessity of remodeling an existing television set.

Still another object of the present invention is to provide a virtual stereographic display system capable of reducing eye fatigue due to flickering, without increasing the frame frequency.

The present invention intends to solve, as described below, the problems referred to above and those taking place in the virtual stereographic display system in which image information for the right eye and the left eye is alternately displayed on a television screen, and light signals of the image information are observed by wearing glasses having a pair of light valves to be alternately opened or closed in synchronization with the switching-over cycle of the image information for the right and left eyes.

In the first place, for solving the problem of glasses to be worn by the viewer with an electronic light valve function that tend to be heavy and expensive, the present inventors have presented a practice in which a polarization control panel utilizing a ferroelectric liquid crystal of birefringence type or guest-host type is disposed in front of the screen, and by observing the control panel through glasses with polarizers, the image information is discriminated by the left and right eyes.

Then, as means for reducing the fatigue of eyes due to rapid variations in the intensity of the transmitted light following the opening or closing of valves, a practice has been proposed to observe the images through glasses equipped with light valves of transient-scattering mode of ferroelectric liquid crystal cells.

Meanwhile, as means for generating the synchronizing signal at low cost through utilization of video equipment such as an existing television set, etc., the present inventors have developed a novel means by which the brightness variation on the image screen is converted into electrical signals by a photo-sensor so as to be subjected frequency division and phase adjustment, thereby to producing the synchronizing signal.

Finally, the unit for eliminating the undesirable flickering through lowering of the frame frequency is characterized in that the unit for switching-over the two kinds of image information for the right and left eyes is constituted by one scanning line or a group of a predetermined plurality of scanning lines. It is to be noted here that the unit for constituting the image is limited to one that utilizes the scanning line in the present invention.

It is also to be noted here that, according to the present invention, although the open/close cycle of the light valves is of a high speed at 15.75 KHz, e.g., in the NTSC system, the present inventors have completed the present invention by making it possible to effect the open/close function at such a high speed through utilization of, for example, the birefringence effect of the ferroelectric liquid crystal for light valves. However, the light valves to be employed in the present invention are not limited to those which employ the ferroelectric liquid crystal.

The term "television" referred to in the present specification relates to the arrangement adapted to transmit images as converted into electrical signals via passages through a wire or wireless system for reproduction of the images by a receiving set. The display device to be used may be the CRT (cathode ray tube), liquid crystal display unit, electro-luminescence display, light emitting diode matrix display, plasma display and screen of a projecting type television, etc. In the present invention, except for those utilizing the scanning lines, all arrangements may be applicable also to video equipment employing films.

In accomplishing the above objects and other objects, according to one preferred embodiment of the present invention, a virtual stereographic display system is provided. The system includes a display image surface, a polarizer disposed before the display image surface, a liquid crystal cell in which ferroelectric smectic liquid crystal is aligned and disposed before the polarizer, a driving circuit connected to the liquid crystal cell so as to apply AC voltage synchronized with frame signal of the image of the display image surface to the liquid crystal cell and to switch over by time division the polarization axes of display light proceeding from the display image surface through the polarizer and the liquid crystal cell, and polarizing glasses having different polarization axes for the left and right eye for viewing the display light.

Since the stereographic display system of the multiplexed double image type according to the present invention has such advantages that the arrangement is simple in construction, and moreover, the glasses to be worn by the viewers are light and inexpensive, the system may be readily utilized at home in general and in classrooms, etc., thus being very suitable for actual applications.

BRIEF DESCRIPTION OF THE DRAWINGS

These and other objects and features of the present invention will become apparent from the following description taken in conjunction with the preferred embodiments thereof with reference to the accompanying drawings, in which:

FIG. 2 is a diagram similar to FIG. 1, which particularly shows a modification thereof;

FIGS. 23(A) to 23(E) are diagrams for explaining the synchronizing relation in the open/close functions for the television signal sent to the image display surface and the glasses with light valves.

DETAILED DESCRIPTION OF THE PREFERRED EMBODIMENTS

Figure 1:
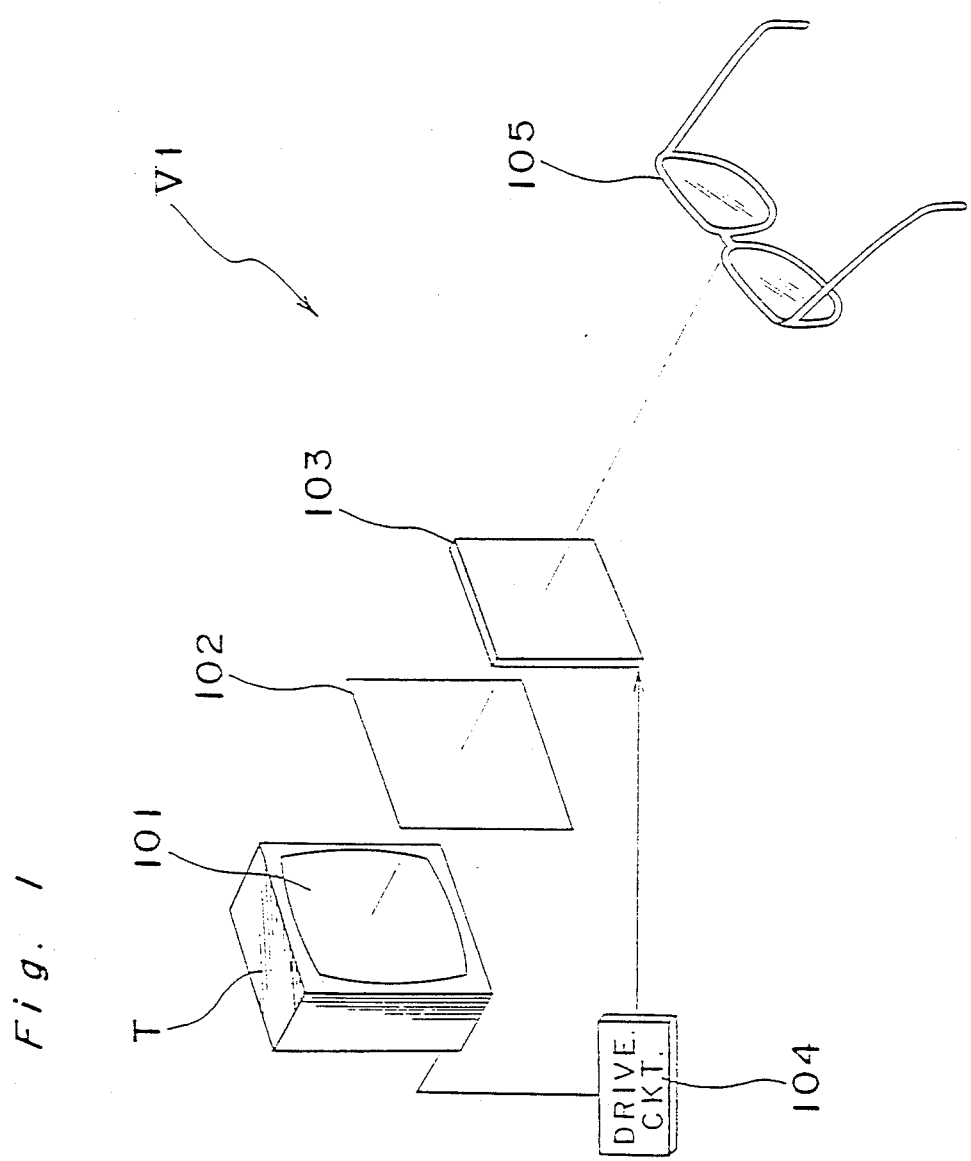
FIG. 1 is a schematic diagram showing a virtual stereographic display system according to one preferred embodiment of the present invention.

Before the description of the present invention proceeds, it is to be noted that like parts are designated by like reference numerals throughout the accompanying drawings.

In the first place, it is to be noted that the display system according to one preferred embodiment of the present invention is characterized in that the stereographic image display is effected in such a manner that, with a liquid crystal cell disposed before a television image surface, the polarization axis of light travelling through said liquid crystal cell is alternately switched over by time division for observation by glasses with polarizing plates through separation into left and right eyes.

[First Embodiment]

Referring now to the drawings, there is shown in FIG. 1 a general construction of a virtual stereographic or stereoscopic image display system V1 according to one preferred embodiment of the present invention, the system generally includes an image display surface 101, e.g., of a television set T, a polarizer or polarizing panel 102 disposed before the image display surface 101, and a liquid crystal cell 103 further disposed before said polarizer 102, with a driving circuit 104 for driving the liquid crystal cell 103 that is connected between the television set and the liquid crystal cell 103 as illustrated.

The liquid crystal cell 103 is prepared through a homogeneous alignment of the ferroelectric smectic liquid crystal, and the cell is provided with transparent electrodes (not particularly shown) disposed at the inner sides of its substrates between which the liquid crystal is enclosed. In this system, the liquid crystal cell 103 functions as an optical compensator capable of rotating the optical axis within the plane of the cell by inverting the polarity of the applied voltage. The driving circuit 104 for the liquid crystal cell 103 is intended to form a voltage waveform to be applied to the liquid crystal cell 103, and arranged to alternately switch-over the optical axis of the liquid crystal cell 103 in synchronization with the frame signal of the television signal fed from the television set T. Observation glasses 105, provided for a viewer to wear, are equipped with polarizing plates having different polarization axes respectively for the left and right eyes. By alternately changing over the polarization axes of light of the television images for observation by the glasses with the polarizing plates in a separated manner at the left and right eyes through time division, the left and right eyes individually watch the television images, and in this case, the television images are observed by the left and right eyes with a stereoscopic parallax.

Depending on the way for utilizing the polarized light, the arrangement of FIG. 1 may be so modified as in a display system V1B in FIG. 2, in which a quarter-wave plate 106 is further disposed before the liquid crystal cell 103 so as to convert a plane-polarized light travelling through said cell 103 approximately in a circularly polarized light.

For introducing the fundamental constructions in FIGS. 1 and 2 into actual applications, there may be conceived three typical systems as described below according to the kinds of polarization and retardation of the crystal cell 103.

In a first system, circularly polarizing plates or polarizers are employed for the glasses 105 in the arrangement of FIG. 1. For the liquid crystal cell 103, a liquid crystal cell may be employed having retardation in the range of 0.1 to 0.15 micron, and rotational angles of the optical axis due to polarity inversion of the applied voltage, in the range of 70° to 110°. Since the liquid crystal cell 103 is adapted to function as a quarter-wave plate, a cell with the retardation of 0.13 micron and rotation angle of the optical axis at 90° is particularly preferable.

Figure 3A:
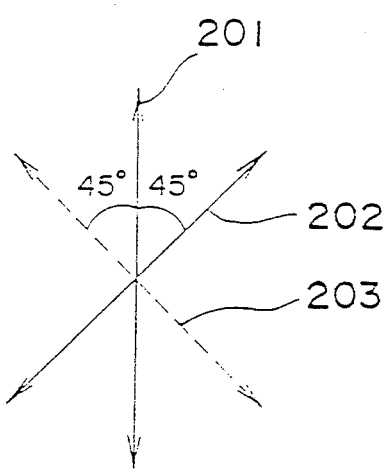
FIGS. 3(A) to 3(C) are explanatory diagrams of angular configurations of optical axes and polarizing axes for optical systems shown in FIGS. 1 and 2.

For the disposition of the liquid crystal cell 103 and the polarizer 102, a setting is made as shown in FIG. 3(A), so that a middle line of two optical axes 202 and 203 may be taken by the optical axis of the liquid crystal cell 103 which is aligned or generally aligned with the polarizing axis 201 of the polarizer 102. The light of the television images becomes the circularly polarized light by the polarizer 102 and the liquid crystal cell 103, and its polarizing axis may be alternately switched over to the left or right through polarity inversion of the voltage to be applied to the liquid crystal cell 103.

In a second system, plane-polarizing plates or polarizers are employed for the glasses 105 in the arrangement of FIG. 1. For the liquid crystal cell 103, a liquid crystal cell may be employed having retardation in the range of 0.2 to 0.3 micron, and rotational angles of the optical axis due to polarity inversion of the applied voltage, in the range of 35° to 55°. Since the liquid crystal cell 103 is adapted to function as a half-wave plate, a cell with the retardation of 0.25 micron and rotational angle of the optical axis at 45° is particularly preferable.

Figure 3B:
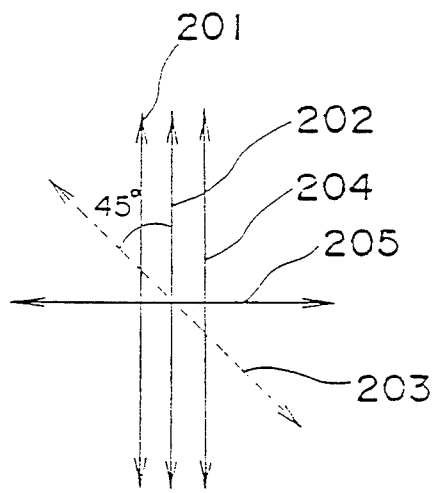

For the disposition of the liquid crystal cell 103 and the polarizer 102, a setting is made as shown in FIG. 3(B), so that one of two optical axes 202 and 203 may be taken by the optical axis of the liquid crystal cell 103 which is aligned or generally aligned with the polarizing axis 201 of the polarizer 102. The light of the television images becomes the plane-polarized light by the polarizer 102 and the liquid crystal cell 103, and its polarizing axis may be alternately switched over in two directions intersecting at right angles through polarity inversion of the voltage to be applied to the liquid crystal cell 103. In the angular configuration of the polarizing axes 204 and 205 of the two plane-polarizing plates to be attached to the glasses 105, it is so arranged that one is aligned with the polarization axis of the polarizer 102 at the side of the television image surface, while the other is set at an angle for intersection at right angles therewith.

In a third system, circularly polarizing plates or polarizers are employed for the glasses 105 in the arrangement of FIG. 2. For the liquid crystal cell 103, a liquid crystal cell may be employed having retardation in the range of 0.2 to 0.3 micron, and rotational angles of the optical axis due to polarity inversion of the applied voltage, in the range of 35° to 55°. Since the liquid crystal cell 103 is adapted to function as a half-wave plate, a cell with the retardation of 0.25 micron and rotational angle of the optical axis at 45° is particularly preferable.

Figure 3C:
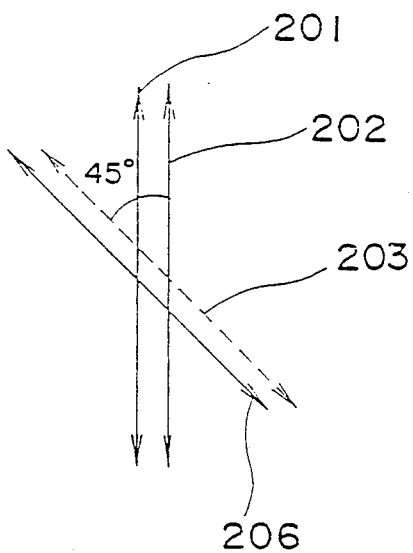

For the disposition of the liquid crystal cell 103 and the polarizer 102, a setting is made as shown in FIG. 3(C), so that one of two optical axes 202 and 203 may be taken by the optical axis of the liquid crystal cell 103 which is aligned or generally aligned with the polarizing axis 201 of the polarizer 102. The optical axis 206 of the quarter-wave plate 106 is so set as to form an angle of approximately 45° with respect to the polarizing axis of the polarizer 102. The light of the television images becomes the circularly polarized light by the polarizer 102, the liquid crystal cell 103, and the quarter-wave plate 106, and its polarizing axis may be alternately switched over toward the left or right through polarity inversion of the voltage to be applied to the liquid crystal cell 103.

In the three systems described in detail so far, the retardation of the liquid crystal cell 103, rotational angle or angular configuration of the optical axis, retardation of the quarter-wave plate 106, angular configuration of the optical axes, and that of the polarizers of the glasses 105, etc. may be suitably deviated from the conditions as described so far for an optimum design.

The ferroelectric smectic liquid crystal cell is very suitable for the embodiment of the present invention. More specifically, there are various superior characteristics which cannot be available from other liquid crystal cells such that it can sufficiently withstand a high speed response at several tens to several hundred microseconds, that the directions of optical axes move only within the plane of the liquid crystal cell 103, and further, that a memory effect is present in the switching state, etc.

Hereinbelow, principles of functioning of the above ferroelectric smectic liquid crystal cell will be described.

Figure 4A:
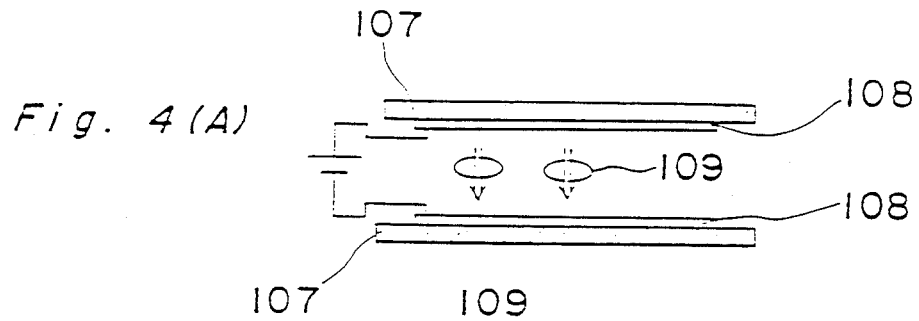
FIGS. 4(A), 4(B), 5(A) and 5(B) are diagrams for explaining the functioning principles of of liquid crystal cells to be employed in the embodiment of the present invention.
Figure 4B:
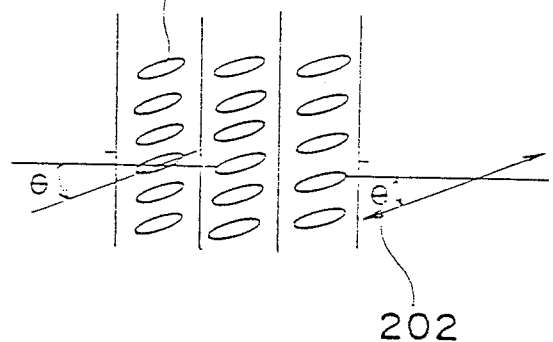
Figure 5A:
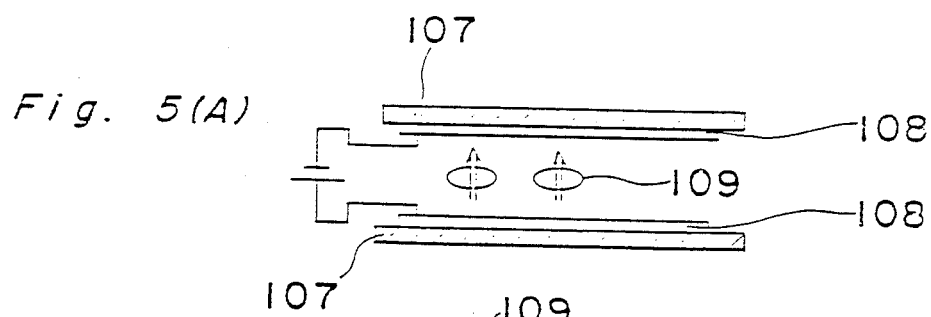
Figure 5B:
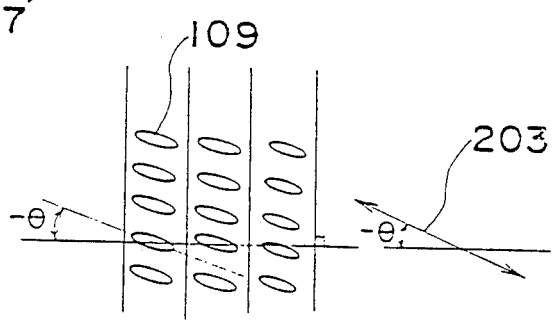

This light switching element utilizing the chiral smectic liquid crystal showing ferroelectric characteristics was published in "Applied Physics Letters" (Vol. 36, page 899, published in 1980) by N. A. Clark and S. T. Lagerwall, and is named as "Surface-Stabilized Ferroelectric Liquid Crystal". FIG. 4(A) shows a cross section of the above liquid crystal cell when an electric field is applied thereto, which includes glass substrates 107, respectively provided at the inner faces thereof, with transparent electrodes 108, between which liquid crystal molecules 109 are accommodated, with the electric field within the cell being directed from the upper portion to the lower portion in the drawing. With respect to the above electric field, dipoles of the liquid crystal molecules 109 are aligned as indicated by the arrows. In the diagram of FIG. 4(B) showing the molecular alignment under the above state as viewed in a direction perpendicular to the cell surface, each of liquid crystal molecules 109 has its long axis inclined by an angle $\theta$ with respect to a line normal to the plane of the alignment lattice, i.e., layer. Subsequently, upon inversion of the polarity of the applied electric field, the dipoles of the liquid crystal molecules 109 are inverted as indicated by the arrows in FIG. 5(A), and each of the liquid crystal molecules 109 changes its azimuth in a direction of an angle $-\theta$ as in FIG. 5(B).

For a practical application purpose, the above liquid crystal cell may be considered, in terms of optical crystallography, to be of an uniaxial crystal having an aligning direction of the molecule long axis as the optical axis. In other words, this liquid crystal cell may be regarded as an optical compensator capable of rotating the optical axis by an angle $2\theta$ through inversion of the polarity of the applied voltage. It is to be noted that the rotation of this optical axis is symetrical around the normal line with respect to the smectic layer, and that the retardation of this liquid crystal cell may be represented by a product of the birefringence $\Delta n$ of the liquid crystal and the thickness d of the cell ($\Delta n \cdot d$).

Although the tilt angle $\theta$ of the liquid crystal molecule 109 differs according to liquid crystal materials, it is preferable that $2\theta$ is of 90° for application to the first system as described earlier, and therefore, a material with the angle $\theta$ of 45° is suitable. While, for the application to the second and third systems also referred to earlier, a material having the angle $\theta$ of 22.5° is suitable, since $2\theta$ should preferably be 45°. However, for the practical application, deviation of the angle $\theta$ by approximately ±10° from the above conditions is permissible.

Figure 6:
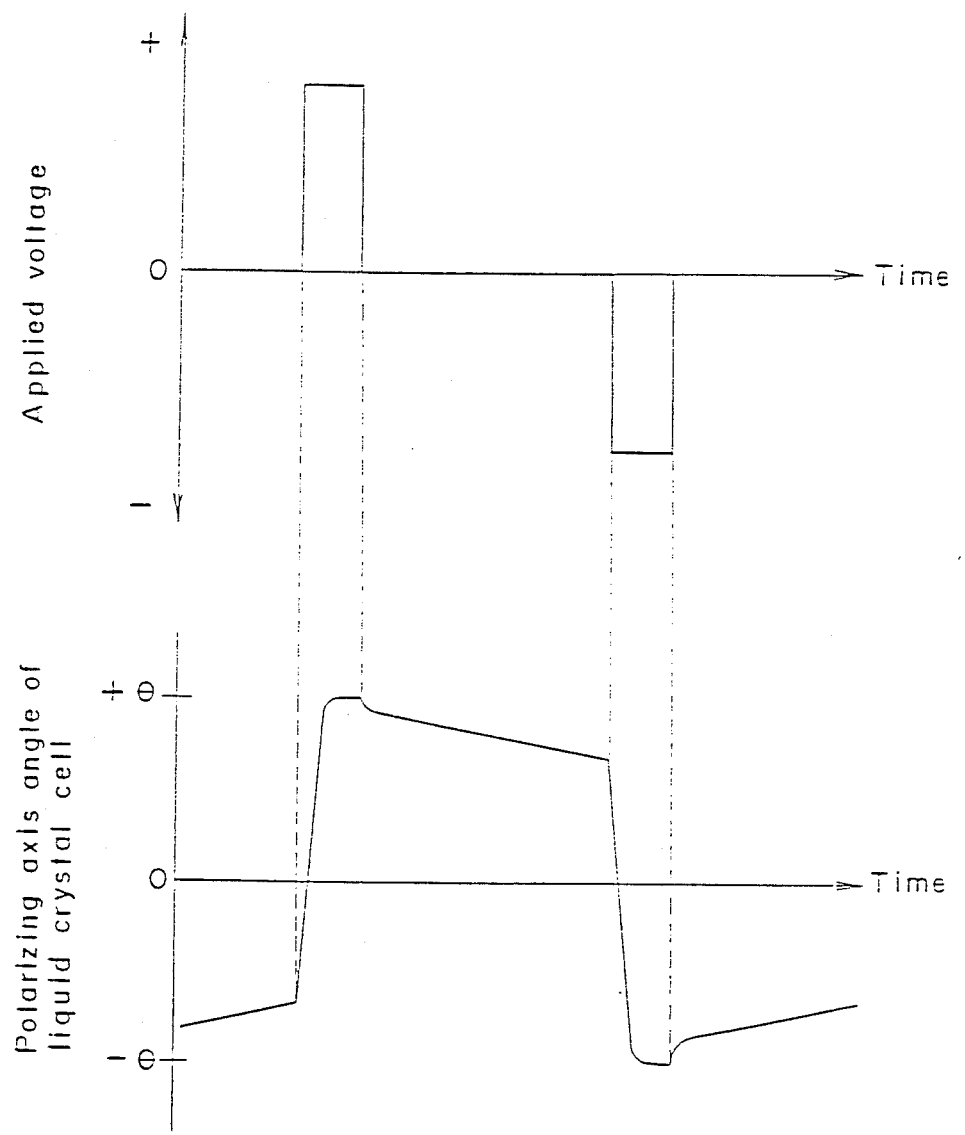
FIG. 6 is a diagram for explaining memory effect of the liquid crystal cell to be employed in the embodiment of the present invention.

The liquid crystal cell as described above shows a memory effect in the on/off switching state. More specifically, as shown in FIG. 6, even when the applied voltage is reduced to 0 V after switching by an electric field in the form of pulses in positive and negative polarities, the respective states of molecular alignment are generally maintained. According to the literature referred to earlier, the response time $\tau$ of this liquid crystal cell is represented by a formula, $$\tau \propto \eta/(Ps \cdot E)$$

where $\eta$ represents the viscosity of the liquid crystal material, Ps shows spontaneous polarization thereof, and E denotes the intensity of the electric field, and for effecting a higher speed switching, a stronger electric field is more advantageous. Various waveforms may be considered for the voltage to be applied to this liquid crystal cell as long as the voltage can effect a faster switching-over speed of the liquid crystal cell than that of the television images, and as the phases of the voltage are properly controlled so that the images may be correctly sent to the left and right eyes. The simplest waveform is a square wave.

Figure 7:
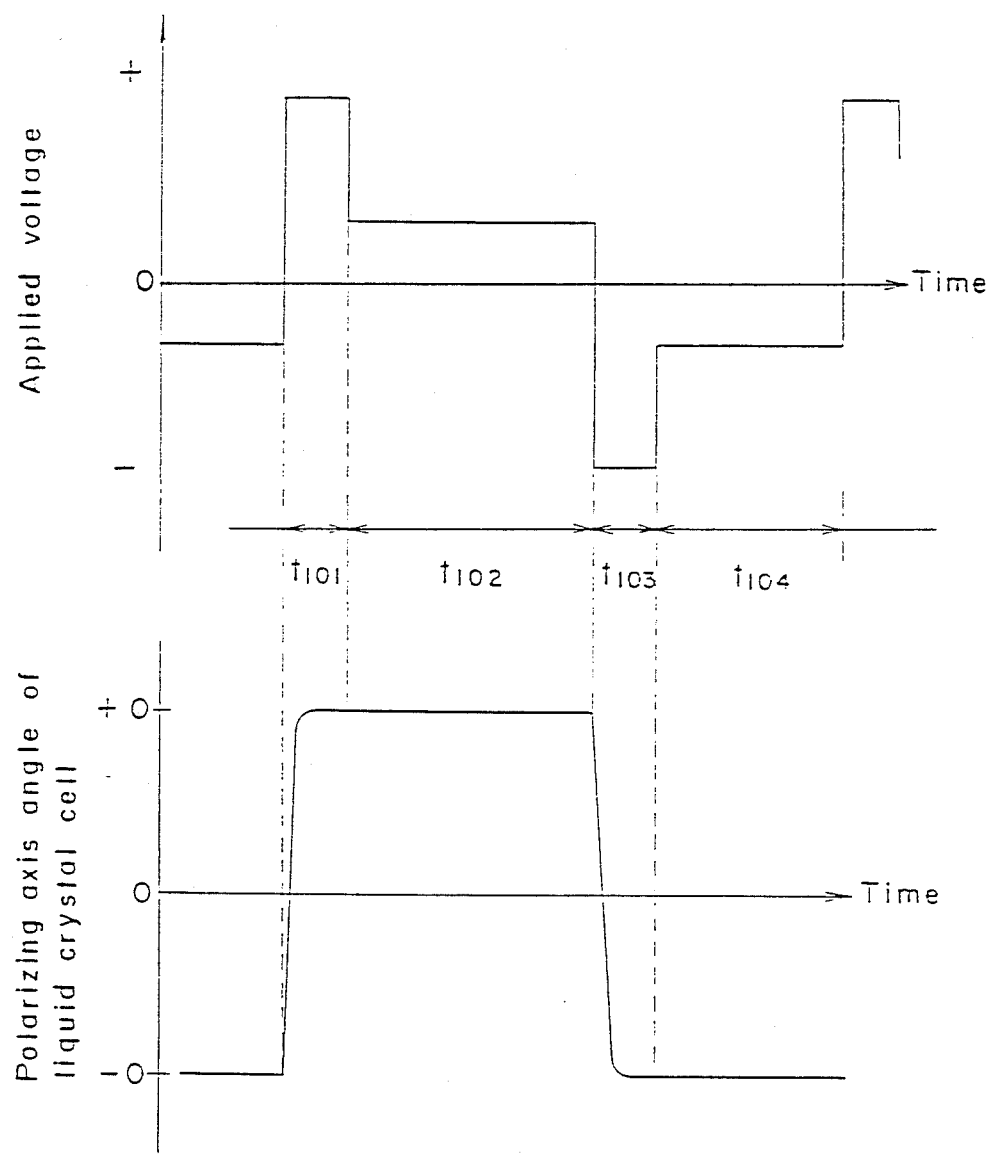
FIG. 7 shows one example of a voltage waveform to be applied to the liquid crystal cell.

Furthermore, if it is intended to save power consumption and obtain long life of the liquid crystal cell through utilization of the memory effect, the waveform as shown in FIG. 7 may be employed, which is so arranged that a high speed switching is effected at voltages having high wave height values such as in the period $t_{101}$ or $t_{103}$, and in the periods $t_{102}$ and $t_{104}$ thereafter. Voltages necessary to maintain the molecular alignment as it is, through utilization of the memory effect, are applied. Moreover, it may be so arranged to superpose a DC offset voltage on the applied voltage waveform in order to improve the retaining characteristics of the memory effect.

As described so far, since the stereographic display system of the multiplexed double image type according to the first embodiment of the present invention has such advantages that the construction is simple, and moreover, the glasses to be worn by the viewers are light and inexpensive, this system may be readily utilized at homes in general, in classrooms, etc., thereby being very suitable for actual applications.

[Second Embodiment]

The virtual stereographic display system according to a second embodiment of the present invention is also characterized in that the stereographic image display is effected in such a manner that, with the liquid crystal cell disposed before the television image surface on which the images for the left eye and right eye are alternately displayed by time division. The polarization axis of light travelling through said liquid crystal cell is alternately switched over by the time division for observation by glasses with polarizing plates through separation into left and right eyes, and thus, the stereographic image display is executed based on the parallax of the respective images produced between after-images in the left eye and right eye.

Figure 8:
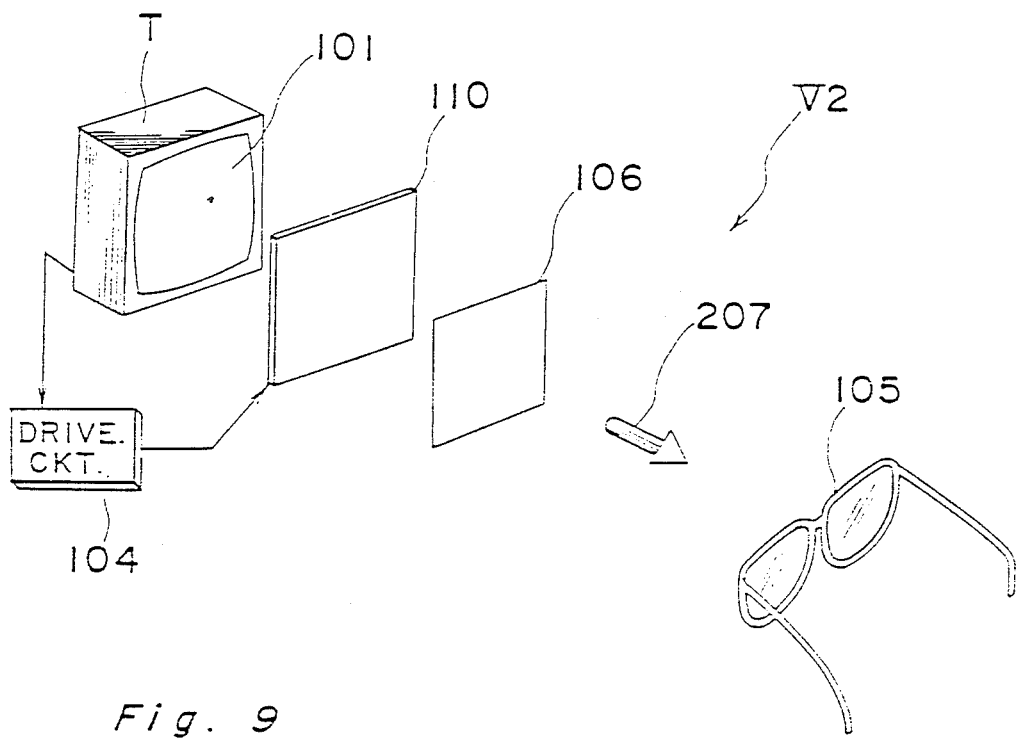
FIG. 8 is a schematic diagram showing a virtual stereographic display system according to a second embodiment of the present invention.

Referring to FIG. 8, there is shown a virtual stereographic image display system V2 according to the second embodiment of the present invention. This system generally includes the image display surface 101 similar to that in the first embodiment of FIG. 1, a guest-host type liquid crystal cell 110 (referred to as a GH liquid crystal cell hereinafter) disposed before the image display surface 101, and a quarter-wave plate 106 further disposed before the GH liquid crystal cell 110 for converting the plane or linearly polarized light travelling through the liquid crystal cell 110 into the generally circularly polarized light 207. The driving circuit 104 for driving the liquid crystal cell 110 is connected between the television set and said liquid crystal cell in a similar manner as in the first embodiment.

The GH liquid crystal cell 110 is prepared through homogeneous alignmnent of a mixed ferroelectric smectic liquid crystal added with a black dichroic dye, and provided with transparent electrodes (not particularly shown) at the inner sides of its substrates for application of an electric field to the mixed liquid crystal. The light travelling through the GH liquid crystal cell 110 becomes the plane polarized light, whose polarization axis may be altered by approximately 90° through switching-over of the voltage applied to the GH liquid crystal cell 110. The driving circuit 104 for the GH liquid crystal cell 110 is intended to form the voltage waveform to be applied to the GH liquid crystal cell 110, and arranged to alternately switch-over the optical axis of the GH liquid crystal cell 110 in synchronization with the frame signal of the television signal fed from the television set T. The glasses 105 provided for the viewer to wear are equipped with circularly polarizing plates having opposite polarization axes respectively for left and right eyes as referred to earlier.

Figure 9:
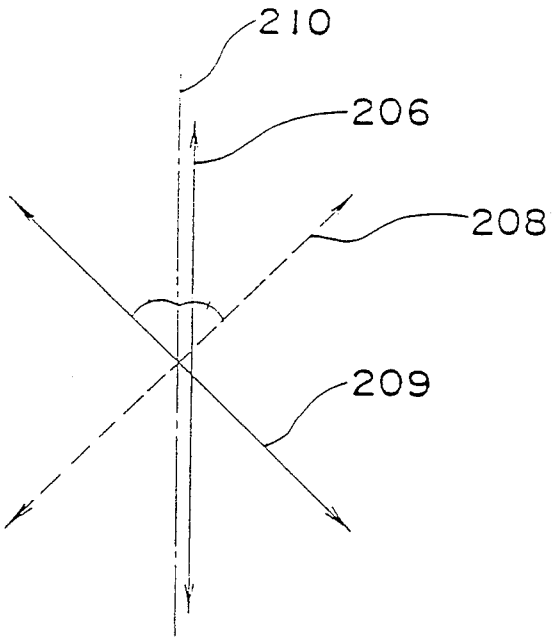
FIG. 9 is a diagram for explaining angular configurations of a liquid crystal cell and a quarter-wave plate for the optical system of FIG. 8.

For setting the optical axis for the quarter-wave plate 106, it should preferably be so arranged as shown in FIG. 9 that, in order to equalize the amount of light reaching the left and right eyes of the viewer as far as possible, the symmetry axis 210 (i.e., a normal line of the smectic layer) of the two optical axes 202 and 203 which can be taken by the GH liquid crysal cell 110, is approximately aligned with the optical axis 206 of the quarter-wave plate 106.

Figure 10:
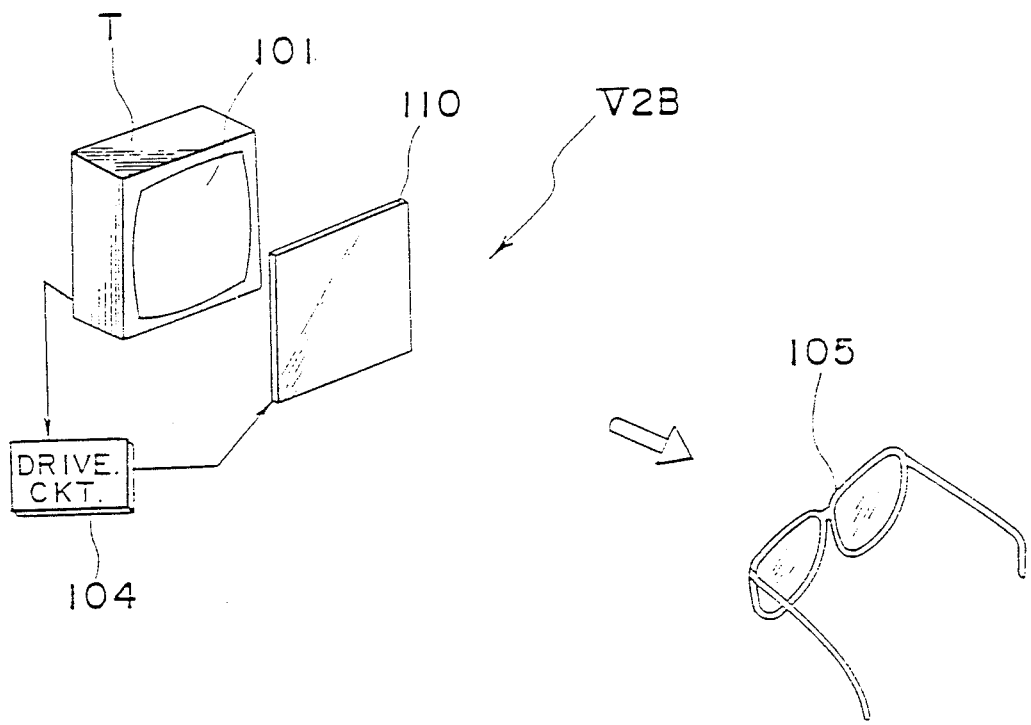
FIG. 10 is a schematic diagram for a virtual stereographic display system showing a modification of the arrangement of FIG. 8.
Figure 11:
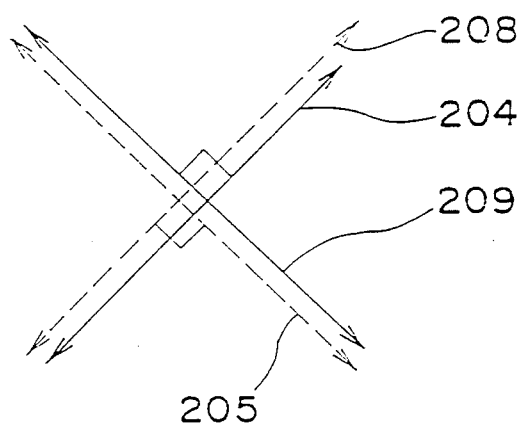
FIG. 11 is a diagram for explaining the angular configuration in the modification of FIG. 10.

The provision of the quarter-wave plate 106 before the liquid crystal cell 110 and the circular polarizing plates on the glasses 105, prevents any adverse effect to the separation of the images for the left and right eyes, even when the viewer inclines his head to the left or right. If such consideration is not particularly required, plane or linear polarizing plates may be attached to the glasses 105 as shown in a modification V2B of FIG. 10. In this modified system V2B, the setting of the two polarization axes 208 and 209 which can be taken by the GH liquid crystal cell 110 and the polarization axes 204 and 205 of the polarizing plates attached to the glasses 105 should be so arranged as shown in FIG. 11, so that one polarization axis 204 of the glasses intersects at right angles with one polarization axis 209 which can be taken by the GH liquid crystal cell 110, while the other polarization axis 205 also intersects at right angles with the other polarization axis 208 which may be taken by the GH liquid crystal cell.

The ferroelectric smectic liquid crystal cell is also very suitable for this embodiment of the present invention. As referred to earlier, there are various superior characteristics which cannot be made available from other liquid crystal cells such that it can sufficiently withstand a high speed response at several tens to several hundred microseconds, and that the directions of optical axes move only within the plane of the GH liquid crystal cell 110, and further, that the memory effect is present in the switching state, etc.

Hereinbelow, the principles of functioning of the above guest-host type ferroelectric smectic liquid crystal cell will be described.

As also referred to earlier, this light switching element utilizing the chiral smectic liquid crystal showing ferroelectric characteristics was published in "Applied Physics Letters" (Vol. 36, page 899, published in 1980) by N. A. Clark and S. T. Lagerwall, and is entitled "Surface-Stabilized Ferroelectric Liquid Crystal". Here, liquid crystal is mixed with the dichroic dye, and is applied to the present invention as will be explained.

Figure 12A:
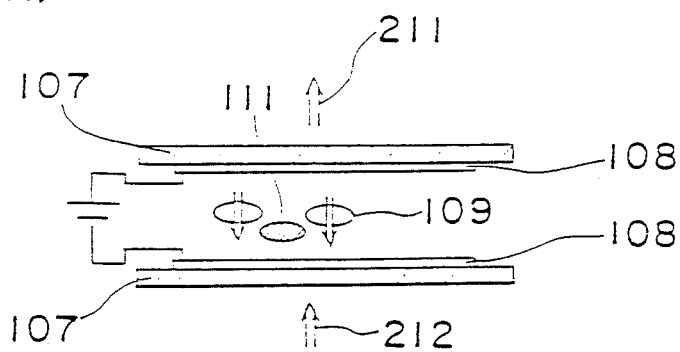
FIGS. 12(A), 12(B), 13(A) and 13(B) are diagrams for explaining the functioning principles of the liquid crystal cells to be employed in the embodiment of the present invention.
Figure 12B:
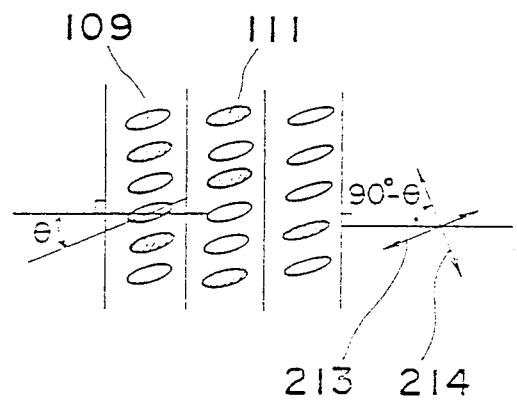

FIG. 12(A) shows a cross section of the above liquid crystal cell when an electric field is applied thereto, which includes glass substrates 107, respectively provided at the inner faces thereof, with transparent electrodes 108, between which liquid crystal molecules 109 are accommodated, with molecules of the dichroic dye and external light being designated by numerals 111 and 212 respectively. In this liquid crystal cell, the electric field is directed from the upper portion to the lower portion in the drawing. With respect to the electric field of above, dipoles of the liquid crystal molecules 109 are aligned as indicated by arrows. In the diagram of FIG. 12(B) showing the molecular alignment under the above state as viewed in a direction perpendicular to the cell surface, each of liquid crystal molecules 109 has its long axis inclined by an angle $\theta$ with respect to a line perpendicular to the plane of the alignment lattice, i.e., layer, with the dichroic dye molecules 111 being also inclined generally in the same direction. In the light travelling through the liquid crystal cell under the above state, a polarization component 213 in the long axis direction of the molecule of the dichroic dye 111 is absorbed by the cell, while another polarization component 214 intersecting at right angles therewith is allowed to pass therethrough. Consequently, the transmitting light becomes a plane or linearly polarized light 211 having $90° - \theta$ as an axis.

Figure 13A:
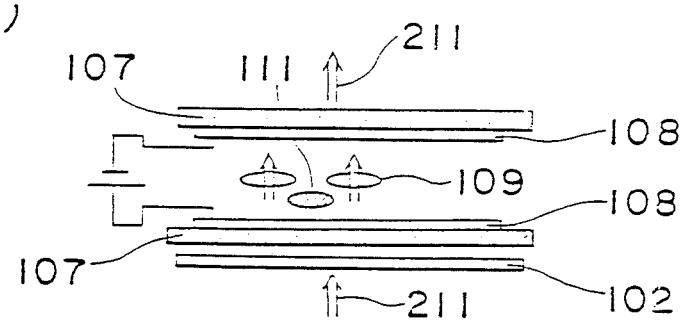
Figure 13B:
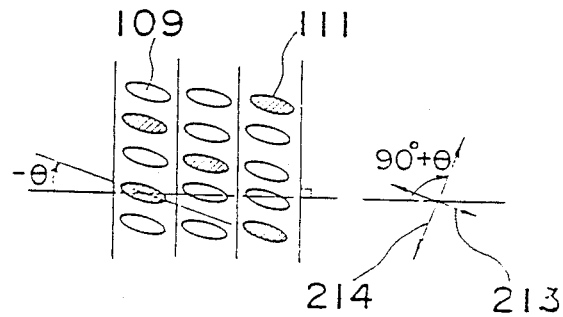

Subsequently, upon inversion of the polarity of the applied electric field, the dipoles of the liquid crystal molecules 109 are inverted as indicated by the arrows in FIG. 13(A). Each of the liquid crystal molecules 109 changes its azimuth in a direction of an angle $-\theta$. Since the molecules 111 of the dichroic dye incline in the same direction, the light transmitting through the liquid crystal cell 110 becomes the plane-polarized light 211 having $90° + \theta$ as an axis.

As described above, this GH liquid crystal cell 110 may be regarded as a polarizer capable of rotating the optical axis by an angle $2\theta$ through an inversion of the polarity of the applied voltage.

Although the tilt angle $\theta$ of the liquid crystal molecule 109 differs according to liquid crystal materials, it is preferable that $2\theta$ is of 90° for application to the first system as described earlier, and therefore, a material with the angle $\theta$ of 45° is suitable.

The liquid crystal cell as described above shows a memory effect in the on/off switching state. More specifically, as also described earlier with reference to FIG. 6, even when the applied voltage is reduced to 0 V after switching by an electric field in the form of pulses in positive and negative polarities, the respective states of molecular alignment are generally maintained. According to the literature referred to earlier, the response time $\tau$ of this liquid crystal cell is represented in a similar manner as referred to earlier by a formula, $$\tau \propto \eta/(Ps \cdot E)$$

where $\eta$ represents viscosity of the liquid crystal material, Ps shows the spontaneous polarization thereof, and E denotes the intensity of electric field, and for effecting a higher speed switching, a stronger electric field is more advantageous. Various waveforms may be considered for the voltage to be applied to this liquid crystal cell as long as the voltage can cause a faster switching-over speed of the liquid crystal cell than that of the television images, and as the phases of the voltage is properly controlled so that the images may be correctly sent to the left and right eyes. The simplest one of waveforms is a square wave.

Furthermore, if it is intended to save power consumption and produce a long life of the liquid crystal cell through utilization of the memory effect, the waveform as shown in FIG. 7 may be employed. The waveform is so arranged that the high speed switching is effected at voltages having high wave height values such as in the period $t_{101}$ or $t_{103}$, and in the periods $t_{102}$ and $t_{104}$ thereafter, voltages necessary to maintain the molecular alignment as it is, through utilization of the memory effect, are applied. Moreover, it may be so arranged to superpose the DC offset voltage on the applied voltage waveform in order to improve the retaining characteristics of the memory effect.

As described so far, the stereographic display system of the multiplexed double image type according to the second embodiment of the present invention has such advantages that the construction is simple, and that the glasses to be worn by the viewers are light and inexpensive. Said system may also be readily utilized at homes in general, in classrooms, etc. and, for actual applications.

[Third Embodiment]

The virtual stereographic display system according to a third embodiment of the present invention is characterized in that the stereographic image display is effected in such a manner that, the images for the left eye and right eye are alternately displayed on the television image display surface through change-over by time division, and such images are observed separately by the left and right eyes by the glasses with light valves.

Figure 14:
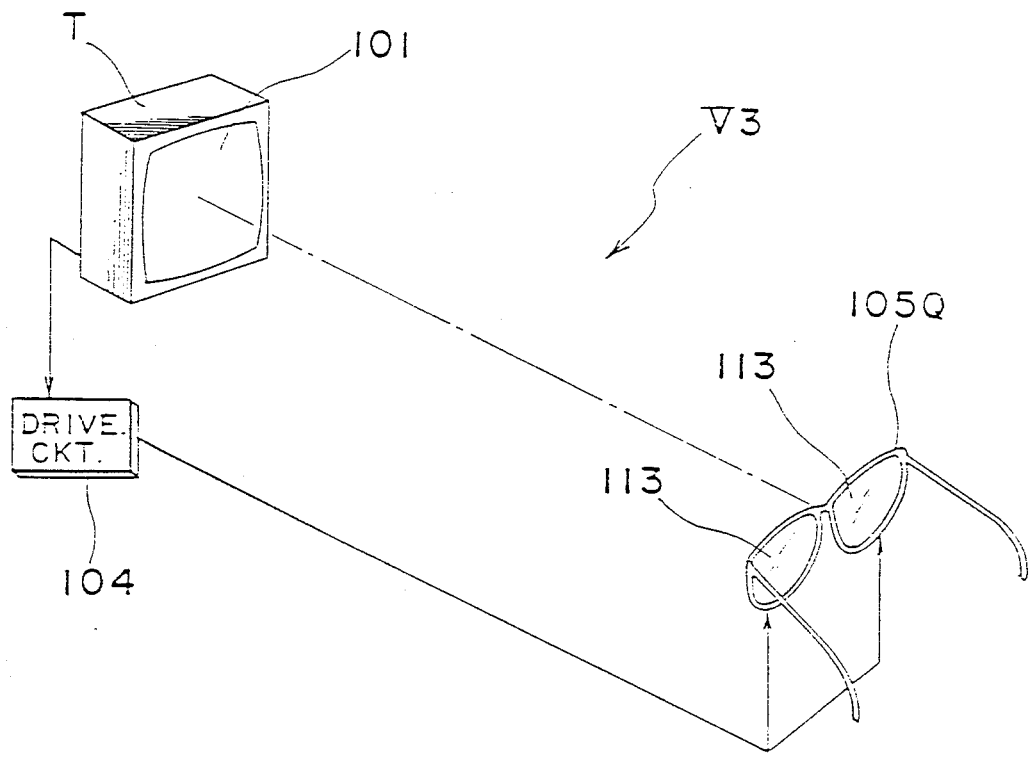
FIG. 14 is a schematic diagram for a virtual stereographic display system according to a third embodiment of the present invention.
Figure 15:
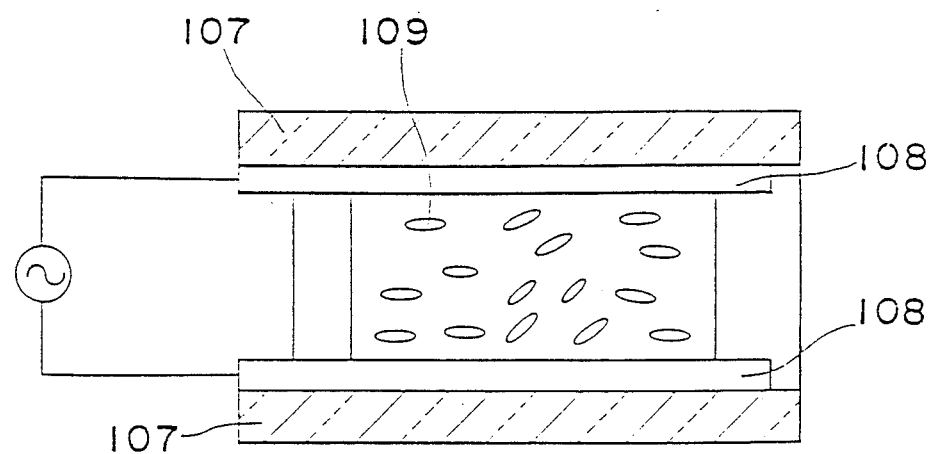
FIG. 15 is a schematic cross section of a liquid crystal cell to be employed in the glasses shown in FIG. 14.

In FIG. 14, there is shown a general construction of a virtual stereographic image display system V3 according to the third embodiment of the present invention. The system generally includes the image display surface 101 of a display unit such as a television set T or the like, and glasses 105Q for a viewer to wear provided with transient scattering mode liquid crystal cells 113 (referred to as TSM liquid crystal cell hereinafter) respectively for the left and right eyes, with the driving circuit 104 being connected between the television set T and the liquid crystal cells 113. Here, the term "television" means, as stated earlier, the arrangement adapted to transmit images as converted into electrical signals via passages through a wire or wireless system for reproduction of the images by a receiving set. The display device to be used therefor, may be a CRT (cathode ray tube), liquid crystal display unit, electro-luminescence display, light emitting diode matrix display, plasma display and screen of a projecting type television, etc. Each of the TSM liquid crystal cells 113 has the ferroelectric smectic liquid crystal molecules 109 enclosed therein, and is provided with the transparent electrode 108 at the inner side of each of the glass substrates 107 as shown in FIG. 15. In the present embodiment, each of the TSM liquid crystal cells 113 functions as an electronic light valve through control of the voltage applied to the transparent electrodes 108. The driving circuit 104 for the TSM liquid crystal cell 113 is intended to form the voltage waveforms to be applied to the TSM liquid crystal cells 113, and is arranged to alternately switch over the left and right TSM liquid crystal cells 113 into a transparent state or scattering state.

As the device for displaying the images, display systems based on projection of photographs and films are similarly utilized besides the electrical display devices such as the television set and the like. In this case, it is only required to replace the image display surface by a reflective or transmissive type, screen and for other appliances, the same ones as those employed in the system of FIG. 14 may be employed.

The transient scattering mode, i.e., TSM ferroelectric smectic liquid crystal cell is very suitable for the purpose of the present invention. More specifically, since the response speed is high at several tens to several hundred microseconds, the liquid crystal cell can fully cope with the frame frequency at several ten Hz, and moreover, since it is of the scattering type, variation in the transmitted light amount due to the opening or closing of the light valves is not excessive, with a consequent of less eye fatigue. Such characteristics as described above cannot be noticed in the other liquid crystal cells.

Subsequently, functioning principles of this ferroelectric smectic liquid crystal cell will be explained.

This light switching element utilizing the chiral smectic liquid crystal showing the ferroelectric characteristic is published in "Japanese Journal of Applied Physics" (Vol. 23, page L385, published in 1984) by K. Yoshino et al., and is named as "Transient Scattering Mode (i.e., TSM) Liquid Crystal". The TSM liquid crystal cell has the cross section as described earlier with reference to FIG. 15, and employs no polarizer.

Hereinbelow, electro-optical effects of this liquid crystal cell will be explained.

Figure 16A:
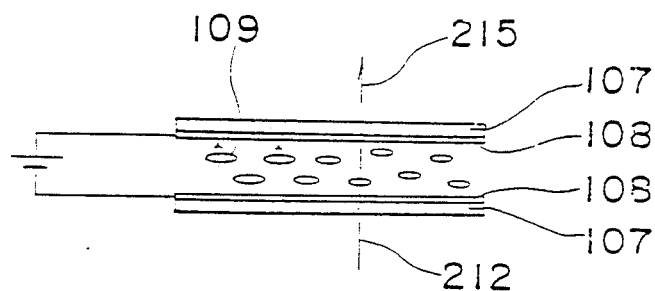
FIGS. 16(A) to 16(D) are diagrams that are used for explaining the functioning principles of the liquid crystal cell employed in the glasses of FIG. 14.

FIG. 16(A) shows the state where a DC voltage is applied to said liquid crystal cell. With respect to this electric field, since dipoles of the liquid crystal molecules 109 are aligned as indicated by the arrows, the liquid crystal molecules 109 are aligned in parallel relation with respect to the substrates 107. In this state, the liquid crystal cell is transparent.

Figure 16B:
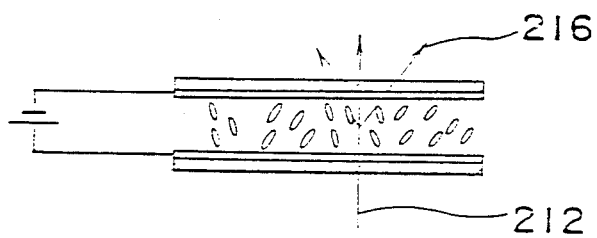
Figure 16C:
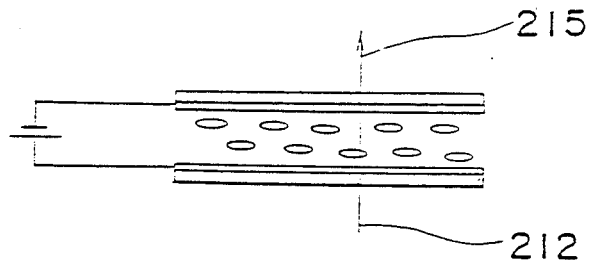
Figure 16D:
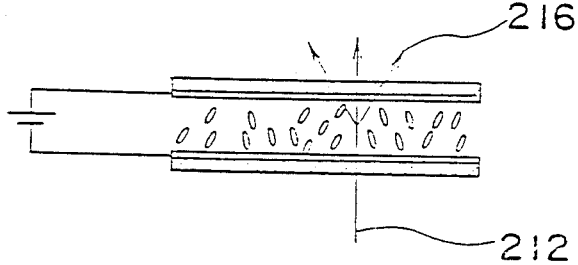

Subsequently, upon inversion of the polarity of the applied electric field, dipoles of the liquid crystal molecules 109 are inverted as shown, and the liquid crystal molecules 109 change the direction thereof so as to be re-aligned in parallel with respect to the substrates 107. In this state also, the liquid crystal cell still remains transparent (FIG. 16(C)). Meanwhile, in the transient state in which the re-alignment of molecules in the inverting process is taking place, light 212 incident upon the cell is scattered as shown at 216 in FIG. 16(B) (the transmitting light is represented by numeral 215). When the polarity of the applied voltage is further inverted, the cell resumes the transparent state in FIG. 16(A) after the transient scattered state as shown in FIG. 16(D).

Figure 17:
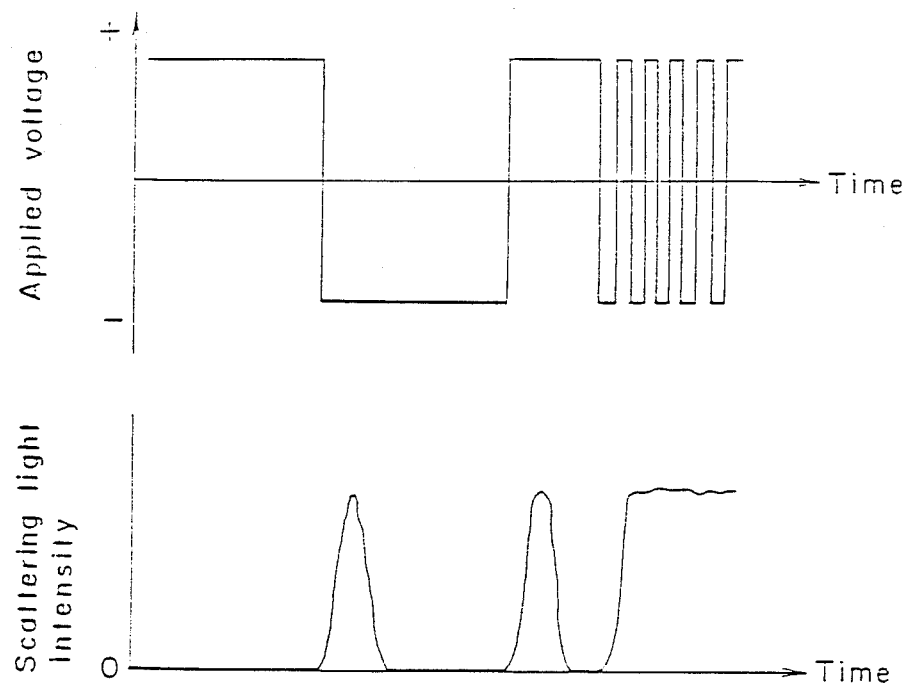
FIG. 17 is a graph for explaining the electro-optical effect of the liquid crystal cell employed in the glasses of FIG. 14.

FIG. 17 shows the relation between the applied voltage waveform and the scattering light intensity. From the diagram in FIG. 17, it is seen that the scattering is started immediately after the polarity of the applied voltage is inverted from the positive polarity to the negative polarity and also from the negative polarity to the positive polarity, and after continuation of the scattering state at a certain time period, the cell again resumes the transparent state. In order to maintain the scattering state for a long time, an AC voltage for a short period may be applied.

Figure 18:
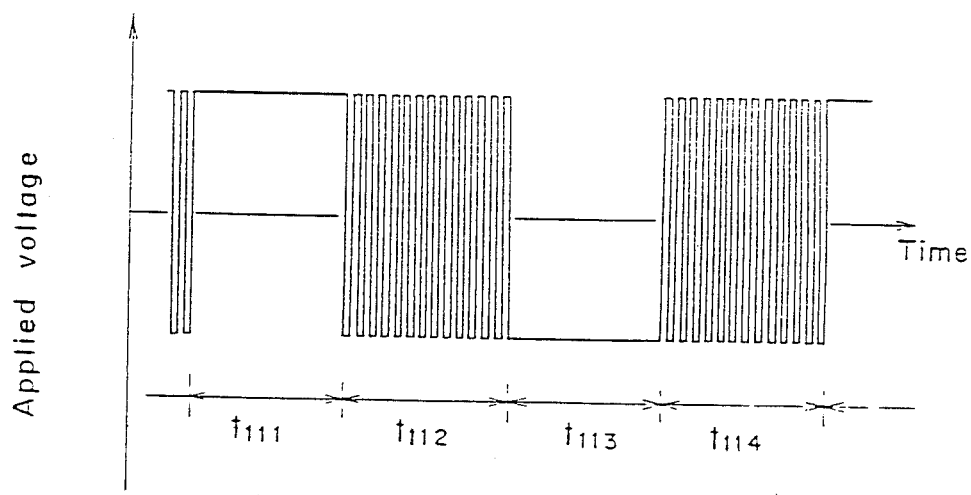
FIG. 18 is a waveform diagram showing one example of a voltage waveform to be applied to the liquid crystal cell employed in the glasses of FIG. 14.

For the purpose of driving the liquid crystal cell having the above characteristics as applied to the display system of the present invention, a waveform as shown in FIG. 18 is suitable. More specifically, in FIG. 18, the liquid crystal cell is brought into the transparent state through application of DC voltage at periods $t_{l11}$ and $t_{l13}$, and into the scattering state through application of AC voltage at periods $t_{l12}$ and $t_{l14}$. By rotatively repeating such four periods, the transparent state and the scattering state are caused to alternately take place. Here, it is so arranged that the time for each of the periods from $t_{l11}$ to $t_{l14}$ is made equal to the display time for one frame, with the polarity of voltage at the periods $t_{l11}$ and $t_{l13}$ being adapted to be reversed in the positive and negative polarities.

Generally, for driving a liquid crystal cell, it is necessary to remove a DC component from the driving waveform in order to prevent deterioration of the liquid crystal by electrolysis. In this respect, the driving waveform as shown in FIG. 18 presents no particular problems, because the maximum period during which the DC voltage is applied to a short time equivalent to one frame time, and no DC component is contained upon time-averaging.

Since the stereographic display system of multiplexed double image type has the advantage in that viewers' eyes are not readily tired, it is suitable to use for a long period of time. Moreover, since the use of television sets and film projection apparatuses at home have widely spread in general, etc., the present invention may be readily effected for wide applications.

[Fourth Embodiment]

The virtual stereographic display system according to a fourth embodiment of the present invention is based on the arrangement that the images for the left eye and right eye are alternately displayed on the television image display surface so as to observe the light signals of the images through the employment of means having a light valve function and driven by a voltage in a waveform synchronized with the frame signal of the images, and characterized in that the signal synchronized with the frame signal is formed by the output signal of a photosensor for detecting brightness variations on the image display surface. Also, a signal different in brightness according to the image for the right eye or the image for the left eye is displayed at a predetermined same region of the image for the right eye as the image for the left eye. The signal is judged on whether it is for forming an image for the right eye or for the left eye by the brightness variation signals as detected by said photosensor.

Figure 19:
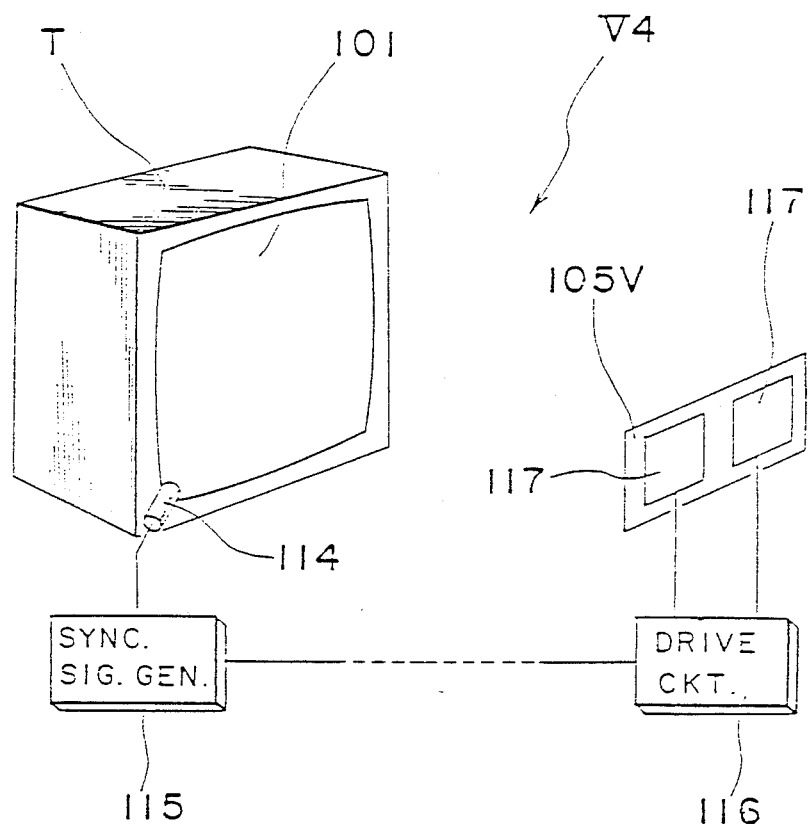
FIG. 19 is a schematic diagram showing a virtual stereographic display system according to a fourth embodiment of the present invention.

Referring to FIG. 19, there is shown a virtual stereographic display system V4 according to the fourth embodiment of the present invention. The system includes the image display surface 101 of a display device such as a television set T or the like, a photosensor 114 disposed in a position capable of detecting brightness variation in a predetermined narrow region of the image display surface 101, a synchronizing signal generation circuit 115 connected to the output end of the photosensor 114 so as to form the frame signal of display from the output of said photosensor 114, and a driving circuit 116 for driving the light valves 117 of the glasses 105V to be worn by the viewer, with said driving circuit 116 being connected to the synchronizing signal generation circuit 115 by a wire or a wireless system (not shown).

In the embodiment of FIG. 19, the photosensor 114 detects the images for the left eye and right eye to be displayed on the image display surface 101 by the brightness variation, and thus, the light valves 117 for the respective left and right eyes are alternately opened or closed according to the frame signal produced by the photosensor 114 and the synchronizing signal generation circuit 115. Therefore, the images for the left eye and the right eye that are to be alternately displayed on the image display surface 101 are respectively separated to the left eye and the right eye of the viewer, and thus, both of the images deviated from each other are observed as composed, thereby providing the stereoscopic view.

Figure 20:
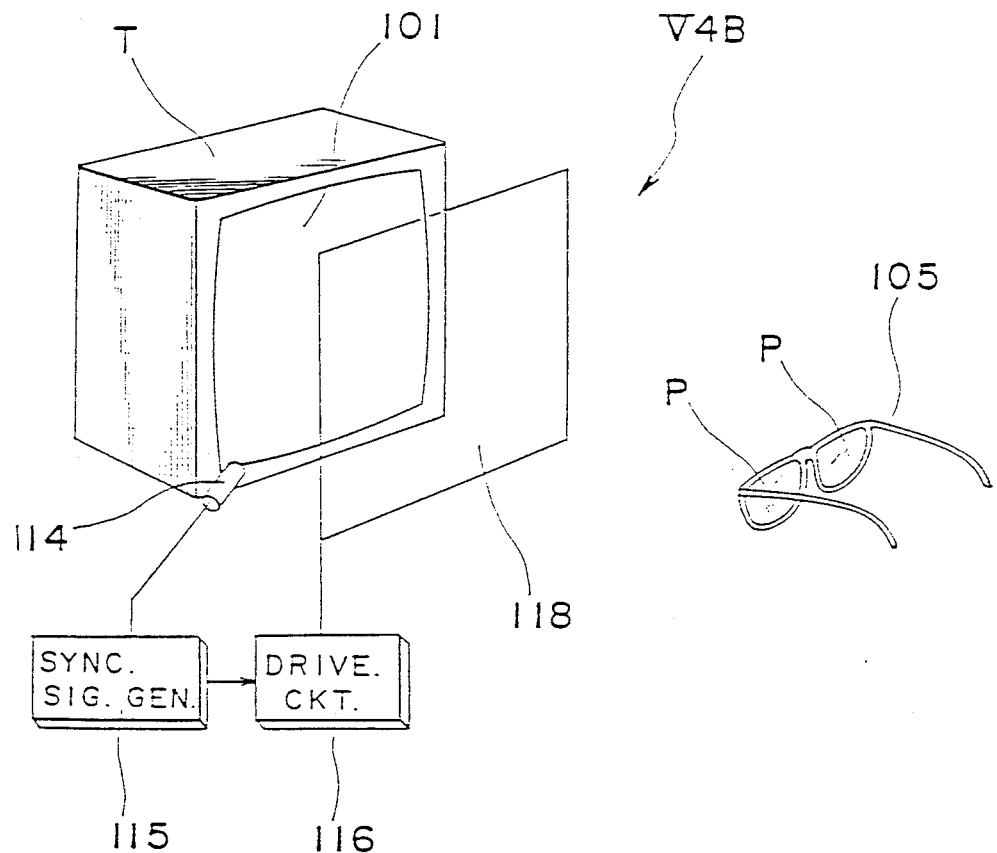
FIG. 20 is a diagram similar to FIG. 19, which particularly shows a modification thereof.

In a modified display system V4B in FIG. 20, a polarization control panel 118 is further disposed before the image display surface 101, and the driver 116 connected to the synchronizing signal generating circuit 115 coupled to the photosensor 114, is connected to said polarization control panel 118, with the glasses 105V with the light valves 117 being replaced by the glasses 105 having polarizing plates P with different polarization axes for the left and right eye.

In the display system V4B, the viewer observes the images on the display surface 101 travelling through the polarization control panel 118 by the glasses 105, in which the images are viewed alternately for the left and right eyes by the polarizing plates P of the glasses 105 at the side coincident with the polarization axis alternately changed over by the control panel 118. The output signal of the photosensor 114 which detects the brightness variation at the predetermined small region on the image display surface 101, is converted into the frame signal by the synchronizing signals generating circuit 115, and in synchronization with this signal, the polarization control panel 118 is driven by the driver 116. More specifically, the polarization axis of the polarization control panel 118 is changed over for each frame signal, and light of the images displayed on the image display surface 101 becomes the plane or circularly polarized light after travelling through the polarization control panel 118. On the image display surface 101, the image for the left eye and the image for the right eye are alternately displayed, and the polarization axis of the polarization control panel 118 is so set that polarization axes of light of the image for the left eye and that for the right eye intersect at a right angle with each other after travelling through said control panel 118. When the light travelling through the polarization control panel 118 is observed by the viewer wearing the glasses 105 provided with the two plane or ciruclarly polarizing plates P at the left and right sides, whose polarization axes intersect each other, the images for the left eye and right eye are respectively separated into the left eye and right eye, and thus, the stereoscopic view may be obtained based on the parallax of both images.

The apparatus for displaying images may be any one so long as it can impart light at an intensity exceeding the sensitivity of the photosensor 114 to said photosensor 114. For example, besides television sets employing the cathode ray tube or liquid crystal display, a flim projecting apparatus may also be employed. In the case where a film projector is used, the photosensor may be disposed near the screen or at least at part of a light path in the projector.

Subsequently, the process for generating the synchronizing signal will be explained by taking up the television as one example.

Figure 21:
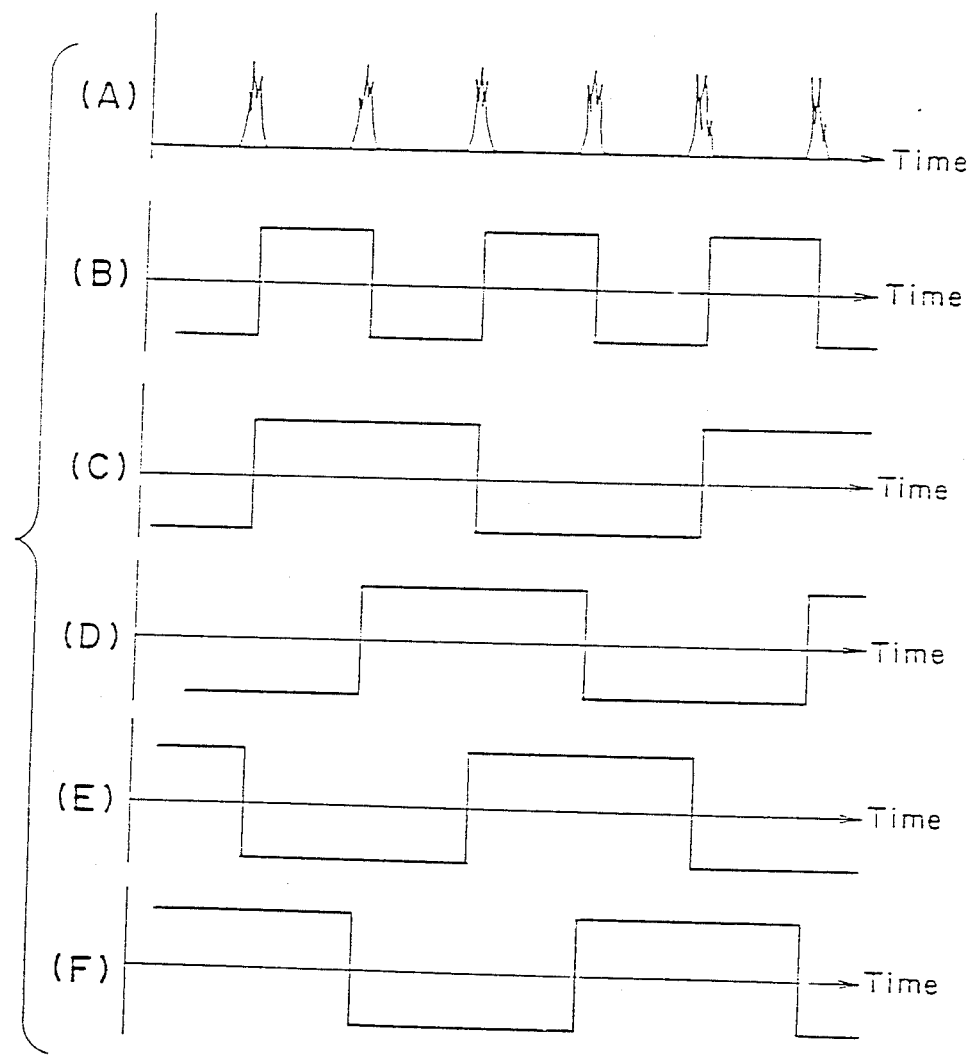
FIG. 21(A—F) are waveform diagrams for explaining the process of obtaining a synchronizing signal for driving the light valves, based on the brightness signal of the image display surface.

When light at a certain predetermined portion of the image display surface 101 of the cathode ray tube for the television set is detected by a photosensor 114 such as a CdS cell, photodiode, photo-transistor or the like, a waveform as shown in FIG. 21(A) is obtained. This waveform is first converted into a square waveform as shown in FIG. 21(B). In an ordinary television apparatus, the system to effect the scanning at two fields for displaying one frame of picture, i.e., the so-called 2:1 interlace scanning is effected. Accordingly, since the waveform in FIG. 21(B) is equal to the frequency of the field scanning, if this is subjected to frequency division to ½, a waveform with the same frequency as the driving frequency of the light valves may be obtained. In this case, the frequency division must be effected at a correct phase relation so that the field scanning in two times for the same frame corresponds to the same frame of the frequency divided waveform. Moreover, if the distinction between the left eye image and right eye image is adapted to correspond to the voltage level of the frame signal, the frequency division should be effected so as to make this phase relation also correct.

More specifically, phases applicable to the frequency division of the waveform in FIG. 21(B) are available in four kinds as represented in FIGS. 21(C) to 21(F), and the viewer can notice the stereoscopic view by only one kind of the above. The simplest way to select the correct phase is to have the viewer himself select the phase so that he can feel the correct stereoscopic view. For other methods, a practice may be conceived to display the phase control signal at part of the image display surface 101. This is the method in which the image information is not displayed at the certain predetermined regions of the image display surface 101, and some information of brightness variation corresponding to the distinction between the left eye image and right eye image is displayed at said region, thereby selecting the brightness phase by the difference as detected by the photosensor. By this method, the phase selection may be completely automated.

Accurate correction is also required for a delicate phase deviation of the frame. Since this mainly depends on the position of light on the image display surface as detected by the photosensor, if the photosensor is properly set and the phase of the frame is finely adjusted, there is not a necessity for any re-adjustments thereafter.

As is seen from the foregoing description, according to the above embodiment of the present invention, the synchronizing signal for driving the light valves may be obtained by only disposing the photosensor near the image display surface of an existing television set, with employment of inexpensive circuits. Therefore a very useful technique for readily enjoying spectacular stereoscopic images at home, etc. can be advantageously presented.

[Fifth Embodiment]

The virtual stereographic display system according to a fifth embodiment of the present invention includes a television display surface on which images for the right eye and left eye are alternately displayed. Observation glasses for observing light signals of said images are provided with a pair of light valves to be opened or closed in turn in synchronization with the cycle for switching over the images for the right eye and the left eye, and is characterized in that the unit for switching-over the two kinds of image information for the right and left eyes is constituted by one scanning line or a group of a predetermined plurality of scanning lines.

As also referred to earlier, the term "television" used here relates to the arrangement adapted to transmit images as converted into electrical signals via passages through a wire or wireless system for reproduction of the images by a receiving set. As the display device to be used therefor, there may be raised the CRT (cathode ray tube), liquid crystal display unit, electro-luminescence display, light emitting diode matrix display, plasma display and screen of a projecting type television, etc. According to the present embodiment, however, the arrangement is limited to that in which the means for constituting the images employs scanning lines.

It is to be noted here that, according to the present invention, the open/close cycle of the light valves is of a high speed at 15.75 KHz, e.g. In the NTSC system, the present inventors have completed the present invention by making it possible to effect the open/close function at such a high speed through utilization of, for example, the birefringence effect of the ferroelectric liquid crystal for light valves. However, the light valves to be employed in the present invention are not limited to those which employ the ferroelectric liquid crystal.

More specifically, in the present embodiment, the repetition unit for alternately displaying the image information for the left eye and the right eye is altered from the conventional frame or field to the scanning line which may be switched over at a higher speed for elimnation of the undesirable flickering. Since the repeating frequency of the scanning line is at 15.75 KHz in the NTSC system as referred to above, and is by far at a higher speed than 30 Hz or 60 Hz for the frame or field frequency, the flickering is not noticeable by viewers.

Referring to FIGS. 22 and 23, principle for the fifth embodiment of the present invention will be explained.

Figure 22A:
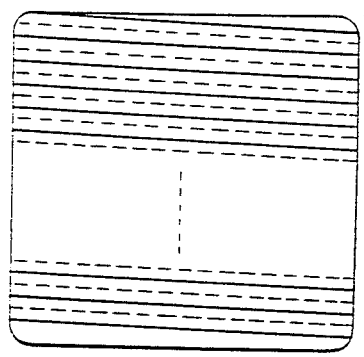
FIGS. 22(A) to 22(C) are diagrams for explaining the state of scanning lines on the image display surface.
Figure 22B:
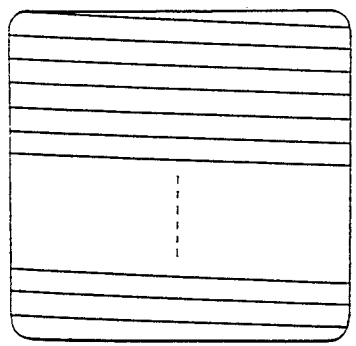
Figure 22C:
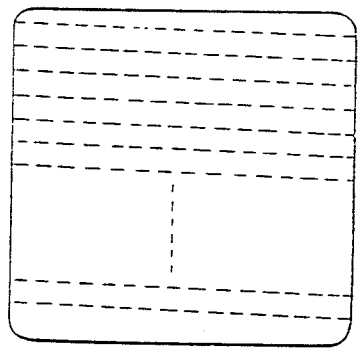

In FIGS. 22(A), 22(B) and 22(C), there are shown scanning lines in one frame of a non-interlace system for a television set employing a cathode ray tube.

As shown in FIG. 22(A), for example, the image information for the right eye is displayed on the odd-numbered scanning lines, while the image information for the left eye is displayed on the even-numbered scanning lines. When the image display surface in FIG. 22(A) is viewed without wearing the glasses 105V with the light valves referred to earlier (FIG. 19), the images for the left eye and the right eye appear to be perfectly overlapped with each other. Meanwhile, if the above images are observed through the glasses 105V with the light valves which are alternately opened or closed for the left and right eyes for each horizontal period in synchronization with the horizontal synchronizing signal, the image for the right eye constituted only by the odd-numbered scanning lines as shown in FIG. 22(B) and the image for the left eye constituted only by the even-numbered scanning lines as shown in FIG. 22(C) are discriminated from each other for arrival at the right and left eye respectively.

FIGS. 23(A) to 23(E) are diagrams showing the synchronizing relation between the television signals and the open/close function of the light valves for the observation glasses. In FIG. 23(A) representing the television signal, symbols Hi, Hi+1, . . . and Hi+6 respectively show the horizontal signal periods at ith, i+1st . . . and i+6th. In FIG. 23(B), there is shown the open/close function at one side of the glasses 105V with the light valves, for example, the open/close function of the light valve 117a for the right eye in a graphical form (FIG. 24), which is driven so as to be actuated in synchronization with the horizontal synchronizing signal. When the image display surface 101 is observed through the light valve 117a, the image information on the scanning lines at Hi+1, Hi+3, and Hi+5 reaches the right eye as shown in FIG. 23(C). The other light valve 117b of the glasses 105 is driven so as to effect the open/close function in the phase relation as shown in FIG. 23(D). Upon observation of the image display surface through this light valve 117b, the image information on the scanning lines at Hi, Hi+2, Hi+4 and Hi+6 reaches the left eye as shown in FIG. 23(E).

Figure 24:
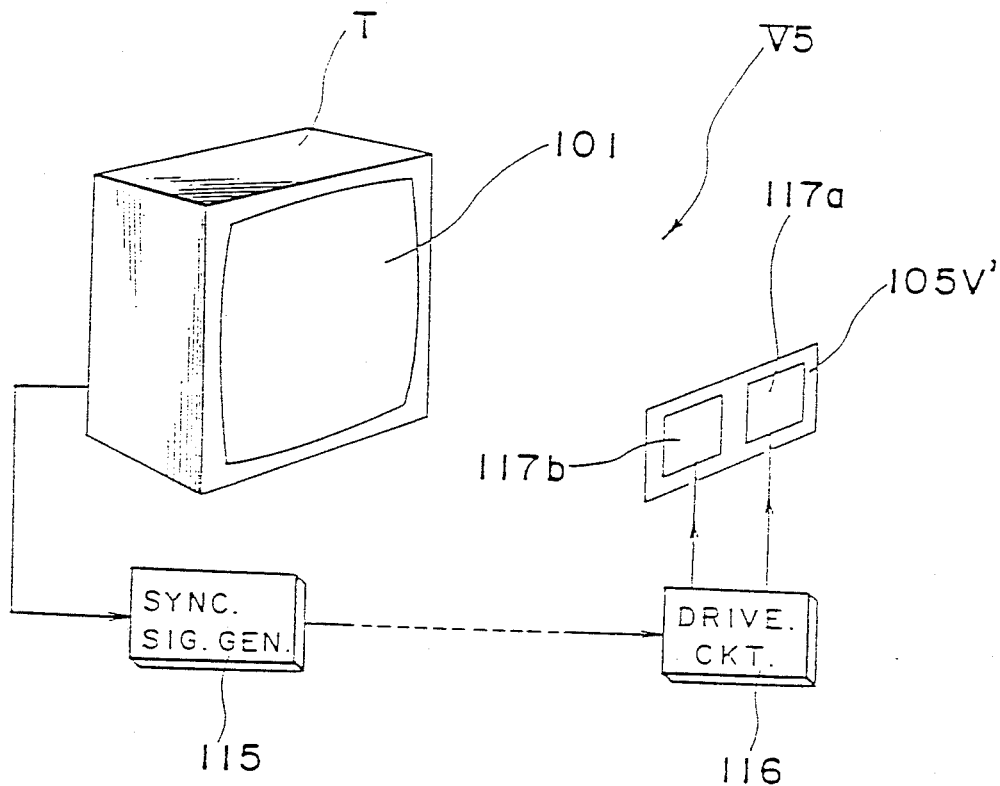
FIG. 24 is a schematic diagram showing a virtual stereographic display system according to a fifth embodiment of the present invention.

Referring also to FIG. 24, there is shown the construction of a virtual stereographic display system V5 according to the fifth embodiment of the present invention related to a television system of non-interlace type.

On the image display surface 101 of a television set T including a cathode ray tube or the like, the image information for the right eye and the left eye is alternately displayed per each horizontal scanning.

The observation glasses 105V' include the light valve 117a for the right eye and the light valve 117b for the left eye which are respectively connected to the driving circuit 116 and further coupled to the television set T through the synchronizing signal generating circuit 115 so as to be alternately opened or closed by the driving signal supplied from the driving circuit 116. The circuits 116 and 115 are coupled to each other through a wire or wireless system. For the functioning signal of the driving circuit 116, a signal obtained through shaping of the horizontal synchronizing signal by the circuit 115 is employed. By the above arrangement, the glasses 105V' having the light valves 117a and 117b are adapted to be opened, at one side thereof, only during the horizontal scanning period of the image display surface, with the other side thereof being closed, and such function is arranged to be alternately repeated.

For the respective light valves 117a and 117b, the ferroelectric smectic liquid crystal cells are employed. More specifically, each of the light valves 117a and 117b include a cell having a pair of substrates each provided with a transparent electrode at its inner side, between which the ferroelectric smectic liquid crystal is enclosed for homogenous alignment, with polarizing plates being disposed on the opposing outer surfaces of the cell.

In the present embodiment, the response speed required for the glasses 105V' with the light valves and related to a horizontal retrace period, is about 11 microseconds, and the ferroelectric smectic liquid crystal cell is extremely suitable for the glasses 105V' having such requirements. In other words, the ferroelectric liquid crystal cell is capable of effecting the switching through high speed response as described above at the applied voltage of ten to several ten volts, and readily provides contrast and transmittance required for the light valves. Such features cannot be available in other liquid crystal cells. The driving circuit 116 is a circuit to produce the voltage waveform to be applied to such liquid crystal cell.

Subsequently, referring back to the diagram for explaining the scanning lines on the image display surface 101 in FIGS. 22(A) to 22(C), and the diagram for explaining the synchronizing relation between the television signal and the open/close function of the glasses with the light valves in FIGS. 23(A) to 23(E), the function of the display system V5 in FIG. 24 will be explained more specifically.

On the image display surface 101 of the non-interlace system, for example, the image information for the right eye is displayed on the odd-numbered scanning lines represented by solid lines, while the image information for the left eye is displayed on the even-numbered scanning lines represented by dotted lines as shown in FIG. 22(A).

As state earlier, FIG. 23(A) denotes the television signal, and symbols Hi, Hi+1, . . . and Hi+6 respectively show the horizontal signal periods at ith, i+1st, . . . and i+6th.

When the image display surface 101 as described above is observed through the light valve 117a to be opened or closed at periods as shown in FIG. 23(B), only the image information on the scanning lines at Hi+1, Hi+3 . . . , etc. reaches the right eye. In other words, the image constituted only by the odd-numbered scanning lines is observed by the right eye as shown in FIG. 22(B). Similarly, through the light valve 117b for the left eye having the open/close function as represented by FIG. 23(D), the image information on the scanning lines at Hi, Hi+2, . . . , etc. is to reach the left eye, and thus, the image constituted only by the even-numbered scanning lines is observed by the left eye as shown in FIG. 22(C).

As referred to earlier also, in the NTSC system, since the repeating frequency of the scanning lines is 15.75 KHz, which is by far a higher speed than in the case where the image information is changed over at the conventional frame or field frequency of 30 Hz or 60 Hz, no flickering is noticed at all.

Subsequently, one example of experiments carried out by the present inventors with respect to the case where the interlace system is employed will be described.

Through employment of a computer graphic image system with the number of scanning lines of 400, still images both for the left eye and right eye were displayed on a cathode ray tube of the interlace system. In the above case, image data were so prepared that on the scanning line numbers 1, 2, 5, 6, . . . 4i+1, 4i+2, 4i+5, 4i+6, . . . 393, 394, 397 and 398, the image for the right eye is displayed, while on the scanning line numbers 3, 4, 7, 8, . . . 4i+3, 4i+4, 4i+7, 4i+8, . . . 395, 396, 399 and 400, the image for the left eye is displayed. By the above arrangement, in the odd-numbered fields, the scanning lines 1, 5, 9, 13, . . . 4i+1, . . . 397, displaying the image information for the right eye and the scanning lines 3, 7, 11, . . .. 4i+3, . . . 399, displaying the image information for the left eye are displayed. Meanwhile, in the even-numbered fields, the scanning lines 2, 6, . . . 4i+2, . . . 398, displaying the image information for the right eye and the scanning lines 4, 8, . . . 4i+4, . . . 400 displaying the image information for the left eye are displayed. When the above images were observed through the glasses having the light valves of ferroelectric smectic liquid crystal cells driven by a square wave at 25 V, 15.75 KHz synchronized with the horizontal synchronizing signal, stereoscopic images completely free from flickering could be observed.

As is clear from the foregoing description, according to the fifth embodiment of the present invention, in the virtual stereographic display system of the multiplexed double image system, since it is so arranged that the change-over of the multiplexed double image information is adapted to be effected per one or a plurality of horizontal scannings, the period of the change-over occurs at a high speed of 15.75 KHz in the change-over per each horizontal scanning, for example, in the NTSC system, and thus, no flickering is felt by the viewers and eye fatigue does not result. Furthermore, since it is not required to change the frame frequency or field frequency of the existing television set, the present invention can be readily put into actual application.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A virtual stereographic display system comprising:
a display image surface;
a polarizer disposed adjacent to said display image surface;
a liquid crystal cell having a ferroelectric smectic liquid crystal aligned therein and being disposed adjacent to said polarizer;
a driving circuit connected to said liquid crystal cell for applying an AC voltage synchronized with a frame signal of an image on said display image surface to said liquid crystal cell and for switching polarization axes of display light developed from said display image surface through said polarizer and said liquid crystal cell by time division; and
polarizing glasses having a first polarization axis for the left eye and a second polarization axis for the right eye for viewing the display light.

2. A virtual stereographic display system as claimed in claim 1, wherein said liquid crystal cell has retardation in the range of 0.1 to 0.15 micron and rotational angles of an optical axis due to polarity inversion of said AC voltage in the range of 70° to 110° with a general coincidence between a middle line of bi-directional axes which can be taken as the optical axis and the polarization axis of said polarizer, said polarizing glasses having polarizing plates which are circular polarizing plates or elliptic polarizing plates for developing a polarizing efficiency close to circularly polarized light.

3. A virtual stereographic display system as claimed in claim 1, wherein said liquid crystal cell has retardation in the range of 0.2 to 0.3 micron and rotational angles of an optical axis due to polarity inversion of said AC voltage in the range of 35° to 55° with a general coincidence between one axis of bi-directional axes which can be taken as the optical axis and the polarization axis of said polarizer, said polarizing glasses having polarizing plates which are plane-polarizing plates.

4. A virtual stereographic display system as claimed in claim 1, wherein said liquid crystal cell has retardation in the range of 0.2 to 0.3 micron and rotational angles of an optical axis due to polarity inversion of said AC voltage in the range of 35° to 55° with a general coincidence between one axis of bi-directional axes which can be taken as the optical axis and the polarization axis of said polarizer, said display system further including a quarter-wave plate disposed in front of said liquid crystal cell to form the optical axis in the range of 35° to 55° with respect to the polarization axis of said polarizer, said polarizing glasses having polarizing plates which are circular polarizing plated or elliptic polarizing plates for developing a polarizing efficiency close to circularly polarized light.

5. A virtual stereographic display system comprising:
a display image surfce;
a liquid crystal cell having ferroelectric smectic liquid crystal mixed with dichroic dye enclosed therein and being disposed adjacent to said display image surface;
a driving circuit connected to said liquid crystal cell for applying an AC voltage synchronized with a frame signal of an image on said display image surface to said liquid crystal cell and for switching polarization axes of display light developed from said display image surface through said liquid crystal cell by time division; and
polarizing glasses having a first polarization axis for the left eye and a second polarization axis for the right eye for viewing the polarized display light.

6. A virtual stereographic display system as claimed in claim 5, wherein the polarization of said polarized glasses is of a plane-polarization.

7. A virtual stereographic display system as claimed in claim 5, wherein a quarter-wave plate is disposed adjacent to said liquid crystal cell, said polarizing glasses being of circular polarization or elliptic polarization for developing the polarization close to the circular polarization.

8. A virtual stereographic display system comprising:
a display image surface for alternately displaying a right eye image and a left eye image; and
observation glasses for observing said display image surface, said observation glasses having light valve means arranged to alternately open and close the right and left eye portions thereof in response to voltages in a waveform synchronized with a frame signal of said right and left eye images, said light valve means having liquid crystal cells in which ferroelectric smectic liquid crystal is enclosed therein, said liquid crystal cells being in a transparent state when a DC voltage is applied thereto, and said liquid crystal cells being in a transient light scattering state when the polarity of said DC voltage is reversed.

9. A virtual stereographic display system as claimed in claim 8, wherein said display image surface comprises a display surface from a television set.

10. A virtual stereographic display system as claimed in claim 8, wherein said display image surface comprises a screen on which said right and left eye images are projected by a film projector.

11. A virtual stereographic display system comprising:
a display image surface for alternately displaying a right eye image and a left eye image; and
means for observing a light signal from said right and left eye images with a light valve function that is driven in response to voltages having a waveform synchronzed with a frame signal of said right and left eye images, and a brightness variation signal is produced by an output signal from a photosensor which detects brightness variations on the display image surface and said brightness variation signal is synchronized with said frame signal.

12. A virtual stereographic display system as claimed in claim 11, whrein a brightness signal develops a different brightness in response to said right and left eye images is displayed in a predetermined region for said right and left eye images, said brightness signal being judged whether said brightness signal corresponds to said right or left eye images in response to said brightness variation signal as detected by said photosensor.

* * * * *